(12) United States Patent
Agarwal et al.

(10) Patent No.: US 8,880,022 B2
(45) Date of Patent: Nov. 4, 2014

(54) PROVIDING PER-APPLICATION RESOURCE USAGE INFORMATION

(75) Inventors: Sharad Agarwal, Seattle, WA (US); Ming Zhang, Redmond, WA (US); Lin Zhong, Houston, TX (US); Ardalan Amiri Sani, Houston, TX (US); Paramvir Bahl, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 525 days.

(21) Appl. No.: 13/293,149

(22) Filed: Nov. 10, 2011

(65) Prior Publication Data

US 2013/0122854 A1    May 16, 2013

(51) Int. Cl.
*H04M 11/00* (2006.01)
*H04L 12/14* (2006.01)
*H04M 15/00* (2006.01)

(52) U.S. Cl.
CPC ........ *H04L 12/1435* (2013.01); *H04L 12/1421* (2013.01); *H04M 15/44* (2013.01); *H04M 15/58* (2013.01); *H04M 15/61* (2013.01); *H04L 12/141* (2013.01); *H04M 15/745* (2013.01); *H04M 15/62* (2013.01); *H04M 15/43* (2013.01); *H04M 15/41* (2013.01); *H04M 15/8083* (2013.01)
USPC ............................. 455/405; 455/406; 455/408

(58) Field of Classification Search
USPC ................... 455/403, 405–408; 709/223–226
See application file for complete search history.

(56) References Cited

U.S. PATENT DOCUMENTS

| | | |
|---|---|---|
| 2007/0299789 A1 | 12/2007 | Young |
| 2008/0275984 A1 * | 11/2008 | Ullmann et al. ............. 709/224 |
| 2010/0003923 A1 | 1/2010 | McKerlich et al. |
| 2010/0015926 A1 | 1/2010 | Luff |
| 2010/0125657 A1 | 5/2010 | Dowling et al. |
| 2011/0138307 A1 | 6/2011 | Eizadi |
| 2011/0151831 A1 | 6/2011 | Pattabiraman |

(Continued)

FOREIGN PATENT DOCUMENTS

WO    2009132710 A1    11/2009

OTHER PUBLICATIONS

"TrafficInfo," retrieved at <<http://www.androidpit.com/en/android/market/apps/app/com.curvefish.apps.trafficinfo/TrafficInfo>>, retrieved on Aug. 19, 2011, Android Apps, Tests, Blog, News and Forum—AndroidPIT, 7 pages.

(Continued)

*Primary Examiner* — Ajit Patel
(74) *Attorney, Agent, or Firm* — Steve Wight; Judy Yee; Micky Minhas

(57) ABSTRACT

An environment is described in which a processing system provides application-level usage information to users. In one scenario, for example, the processing system may provide personal usage information to a user who is operating a user device. The personal usage information itemizes the amount of data (and/or other resources) that has been consumed by each application run by the user device. In another scenario, the processing system may provide expected usage information associated with at least one candidate application provided by a marketplace system. The expected usage information describes an expected consumption of data (and/or other resources) by the candidate application upon running the candidate application by the user device. The processing system can tailor the expected usage information that it sends to a particular user based on user profile data. The user profile data describes a manner in which users operate applications.

20 Claims, 18 Drawing Sheets

(56) References Cited

U.S. PATENT DOCUMENTS

| | | | | |
|---|---|---|---|---|
| 2012/0254420 | A1* | 10/2012 | Hassan et al. | 709/224 |
| 2013/0012161 | A1* | 1/2013 | Rubin et al. | 455/406 |
| 2013/0054378 | A1* | 2/2013 | Hao et al. | 705/14.66 |
| 2013/0067061 | A1* | 3/2013 | Khalid et al. | 709/224 |
| 2013/0078949 | A1* | 3/2013 | Pecen et al. | 455/411 |
| 2013/0217357 | A1* | 8/2013 | Menezes et al. | 455/406 |
| 2013/0219058 | A1* | 8/2013 | Hassan et al. | 709/224 |
| 2013/0219068 | A1* | 8/2013 | Ballani et al. | 709/226 |
| 2014/0162593 | A1* | 6/2014 | Young et al. | 455/405 |

OTHER PUBLICATIONS

Urban, Raphael, "One week in the life of the iPhone's Internet Traffic," retrieved at <<http://cst.mi.fu-berlin.de/teaching/SS11/19510b-PS-TI/raphael-urban-report.pdf>>, Proseminar Technische Informatik SoSe 11, Freie Universitat Berlin, 2010, 12 pages.

Kim, et al., "Application-Level Traffic Monitoring and an Analysis on IP Networks," retrieved at <<http://etrij.etri.re.kr/Cyber/Download/PublishedPaper/2701/27-01-03.pdf>>, ETRI Journal, vol. 27, No. 1, Feb. 2005, pp. 22-42.

"Mobile Data Usage Meter," retrieved at <<http://www.telstrabusiness.com/business/portal/online/site/myaccount/mobiledatausagemeter.94003>>, retrieved on Aug. 19, 2011, Telstra Corporation Limited, Melbourne, Australia, 4 pages.

"Network TrafficStats Lite," retrieved at <<http://www.cyrket.com/p/android/com.trafficstats/>>, retrieved on Aug. 19, 2011, Cyrket.com, 1 page.

Gruet, Richard, 3G Watchdog product review, retrieved at <<http://www.androlib.com/android.application.net-rgruet-android-g3watchdog-zzA.aspx>>, retrieved on Aug. 31, 2011, Androlib.com, 4 pages.

"PowerTutor, A Power Monitor for Android-Based Mobile Platforms," retrieved at <<http://ziyang.eecs.umich.edu/projects/powertutor/>>, retrieved on Oct. 21, 2011, 2 pages.

Jaquier, Cyril, NetCounter product review, retrieved at <<http://www.androlib.com/android.application.net-jaqpot-netcounter-qDj.aspx>>, retrieved on Aug. 31, 2011, Androlib.com, 3 pages.

"About Event Tracing," retrieved at <<http://msdn.microsoft.com/en-us/library/windows/desktop/aa363668(v=vs.85).aspx>>, retrieved on Nov. 9, 2011, Microsoft Corporation, Redmond, WA, 3 pages.

International Search Report and Written Opinion for PCT/US2012/064010, date of mailing: Mar. 11, 2013, 9 pages.

* cited by examiner

PERSONAL USAGE
INFORMATION
SCENARIOS

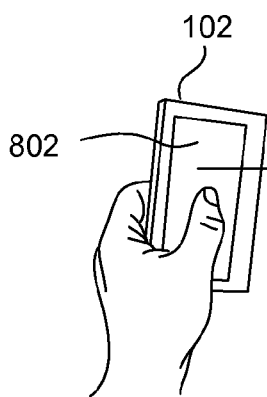

SCENARIO A

```
Here is your current usage for
this billing period:

Appln A: 13 MB
Appln B: 10 MB
Appln C: 3.3 MB

Total:   26.3 MB
```

SCENARIO B

```
Here is your current usage for
this billing period:

3G        WiFi
Appln A:    10 MB     3 MB
Appln B:    5 MB      5 MB
Appln C:    3.3 MB    0 MB Total:      18.3 MB   8 MB
```

SCENARIO C

```
Here is your current usage for
this billing period, which ends on Sept. 30th:

Appln A: 13 MB of an allocated 100 MB
Appln B: 10 MB of an allocated 100 MB
Appln C: 3.3 MB of an allocated 30 MB Total 26.3 of an allocated 1 GB
```

FIG. 8

PERSONAL USAGE
INFORMATION
SCENARIOS

SCENARIO D

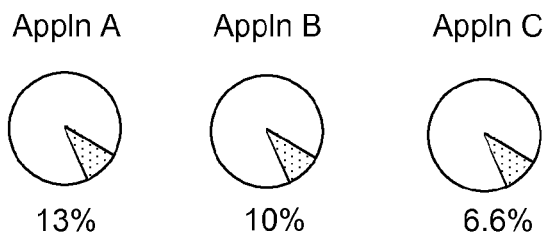

Here is your current usage for
this billing period, which ends on Sept. 30th:

Appln A     Appln B     Appln C

13%        10%        6.6%

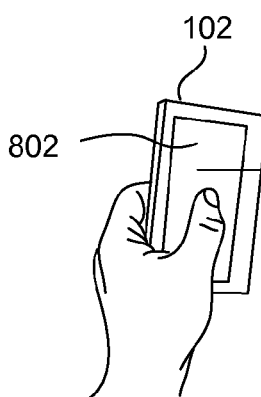

SCENARIO E

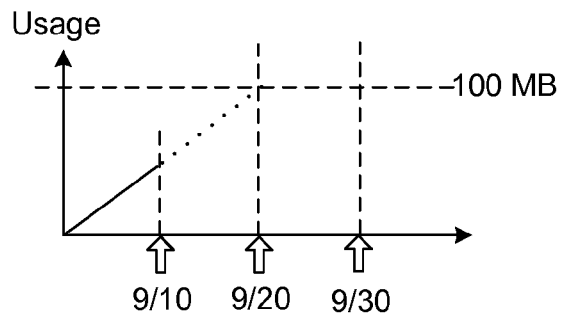

Here is your current and projected
usage for Appln D for this month:

Usage

—100 MB

9/10   9/20   9/30

You have consumed 50 MB of a total of
100 MB allocated for this application. If
you continue at the current rate, you will
exceed your quota on about 9/20.

FIG. 9

PERSONAL USAGE
INFORMATION
SCENARIOS

SCENARIO F:

```
Here is your current usage for
this billing period, with reference to
typical consumption exhibited by other
users.
                You            Other Users Appln A:    13 MB              10 MB
Appln B:    10 MB              15 MB
Appln C:    3.3 MB             10 MB Total:      26.3 MB            35 MB
```

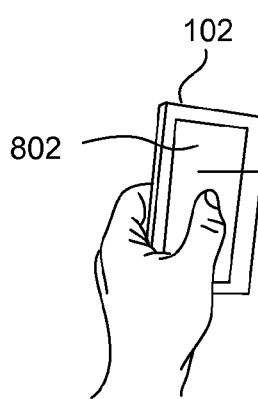

SCENARIO G:

```
Here is your current usage for
this billing period, with reference to
typical consumption exhibited by other
users who share your consumption
habits.
                You            Similar Users Appln A:    13 MB              15 MB
Appln B:    10 MB              10 MB
Appln C:    3.3 MB              5 MB Total:      26.3 MB            30 MB
```

FIG. 10

EXPECTED USAGE INFORMATION SCENARIOS

---

Application X: "Traffic Tracker" Application

Description  This Application allows you to monitor traffic on major roadways in the greater Seattle Area. See more.

Review

Usage Characteristics

Download Now

1102

EXAMPLES OF EXPECTED USAGE INFORMAITON

---

Average monthly consumption: 30 MB
Standard deviation: 5 MB

1104

AND/OR

---

Average monthly consumption for users like you: 20 MB

1106

AND/OR

---

   This application has been rated "Usage Light"!

1108

AND/OR

---

Here is a distribution that shows how much data this application consumes, when used by others.

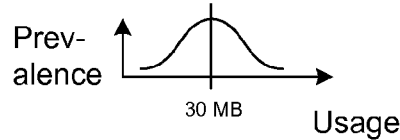

1110

AND/OR

---

This application is new. It is estimated that it will consume, on average, 25 MB per month.

Here is your current data and energy usage for this billing period.

| | Data | Energy* |
|---|---|---|
| Appln A: | 13 MB | 5% |
| Appln B: | 10 MB | 2% |
| Appln C: | 3.3 MB | 30% |
| Total: | 26.3 MB | 37% |

*Measured in percent of total energy consumption in your billing cycle

DETAILED USAGE SUMMARY FOR USER

Application A has consumed a total of 25 MB of data in the previous billing period. The following provides information regarding functions that contributed to this total consumption.

• Usage attributed to the principal application task: 18 MB
• Usage attributed to other "backend" tasks (such as the presentation of ads): 7 MB

 This application receives a rating of 5.5 out of 10 for data efficiency.

DETAILED USAGE SUMMARY FOR USER

Here is a summary of your consumption of different data types in the previous month.

| Text | Images | Audio Streaming | Video Streaming |
|---|---|---|---|
| 50 MB | 100 MB | 200 MB | 500 MB |

DETAILED USAGE SUMMARY FOR DEVELOPER (OR OTHER ENTITY)

Here is a summary of the function of Application A, based on usage data received from 3,459 users who used this application last month.

| Appln Function | Avg Consumption | Affected Entities |
|---|---|---|
| Function X | 5 MB | L, M, N |
| Function Y | 10 MB | R, S, T |
| Function Z | 7 MB | G, H, I |

PROVIDING PER-APPLICATION RESOURCE USAGE INFORMATION

BACKGROUND

User devices may communicate with remote entities via wireless communication, subject to different types of contractual data plans. In a first type of data plan, a wireless communication provider (a "provider") may allow a user to consume an unlimited amount of data within a billing cycle without the payment of usage-related surcharges. As used herein, an application is said to "consume" data when it causes the data to be sent or received over wireless communication infrastructure. In a second type of data plan, a provider may allow a user to consume data up to an identified threshold in the course of the billing cycle, or to consume data on a per-transaction basis.

In environments that use the second type of data plan, a provider can offer various tools that enable a user to determine the total amount of data that he or she has consumed at any point in the billing cycle. For example, in one case, the user may send a usage-related inquiry to a server associated with the provider. The server responds by notifying the user of the total amount of data that has been consumed by the user's device thus far in the billing cycle.

The above-described tool helps the user regulate his or her consumption of data. However, there is room for improvement in known systems for conveying usage-related information to users.

SUMMARY

An environment is described herein in which a processing system provides application-level usage information to users. In one scenario, for example, the processing system may provide personal usage information to a user who is operating a user device. The personal usage information itemizes the amount of data (and/or other resource(s)) that have been consumed by each application that is run by the user device within a defined period of time. The processing system can generate the personal usage information by collecting actual usage data from the user device.

In another scenario, the processing system may provide expected usage information associated with at least one candidate application provided by a marketplace system. The expected usage information describes an amount of data (and/or other resource(s)) that the candidate application is expected to consume after it is run by the user device. The processing system can generate the expected usage information by collecting actual usage data from a group of user devices which have previously executed the candidate application, and then processing that actual usage data in various ways (e.g., by forming an average value, etc.). Alternatively, or in addition, the processing system can generate the expected usage information based on simulated usage data.

According to another illustrative feature, the processing system can tailor the expected usage information that it sends to a particular user based on user profile data. In one case, the user profile data characterizes the consumption-related behavior of the particular user, as well as each user in a group of other users. More specifically, the processing system can leverage the user profile data to generate expected usage information based on actual usage data received from a subset of the other users who share at least one usage-related characteristic in common with the particular user.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 8-15 show examples of different types of usage information that the environment of FIG. 1 can provide to a user or other entity.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative environment for supplying application-level usage information to users who operate applications on respective user devices. Section B describes illustrative methods which explain the operation of the environment of Section A. Section C describes illustrative computing functionality that can be used to implement any aspect of the features described in Sections A and B.

Figure 20:
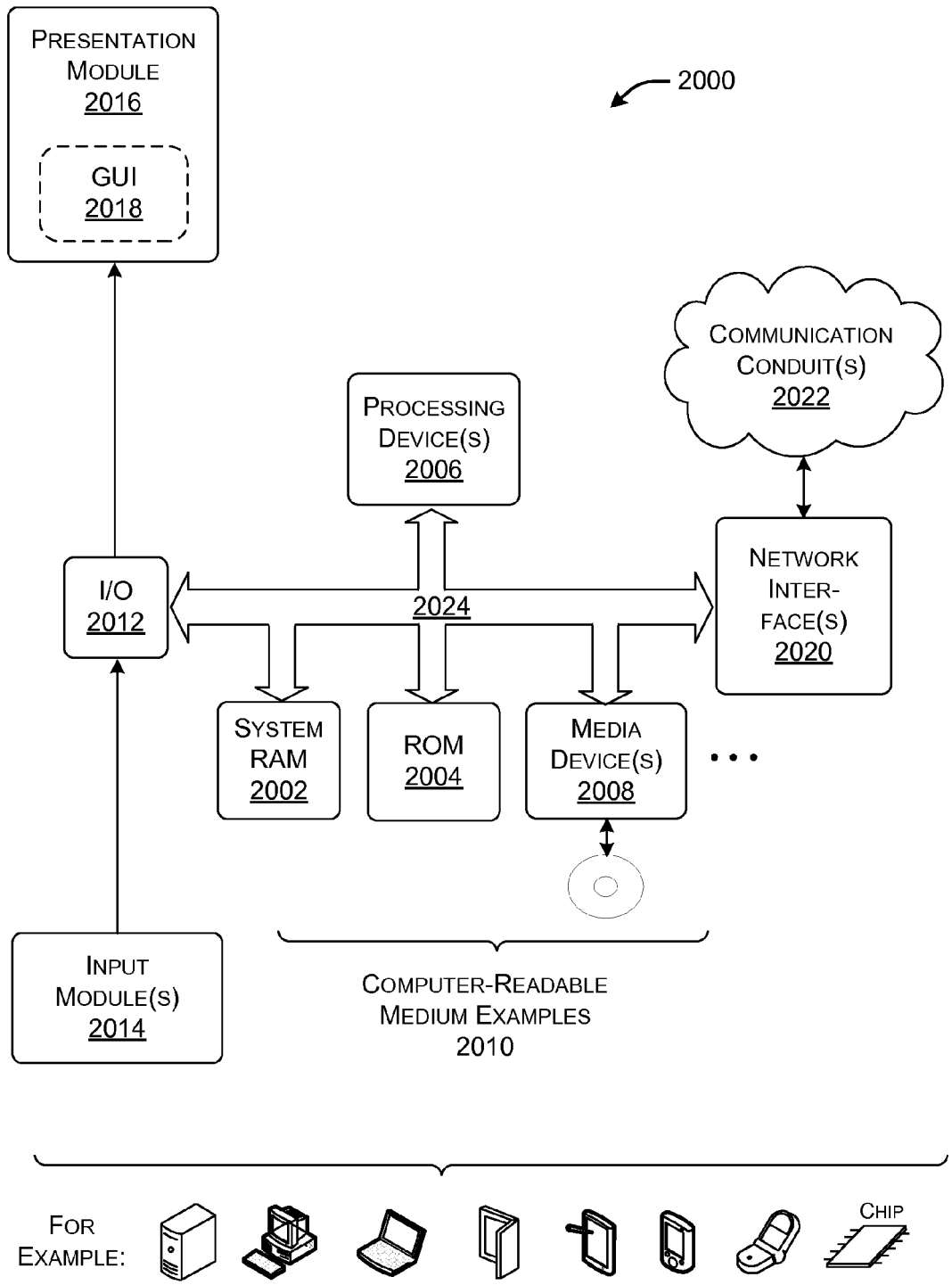
FIG. 20 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 20, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

Figure 1:
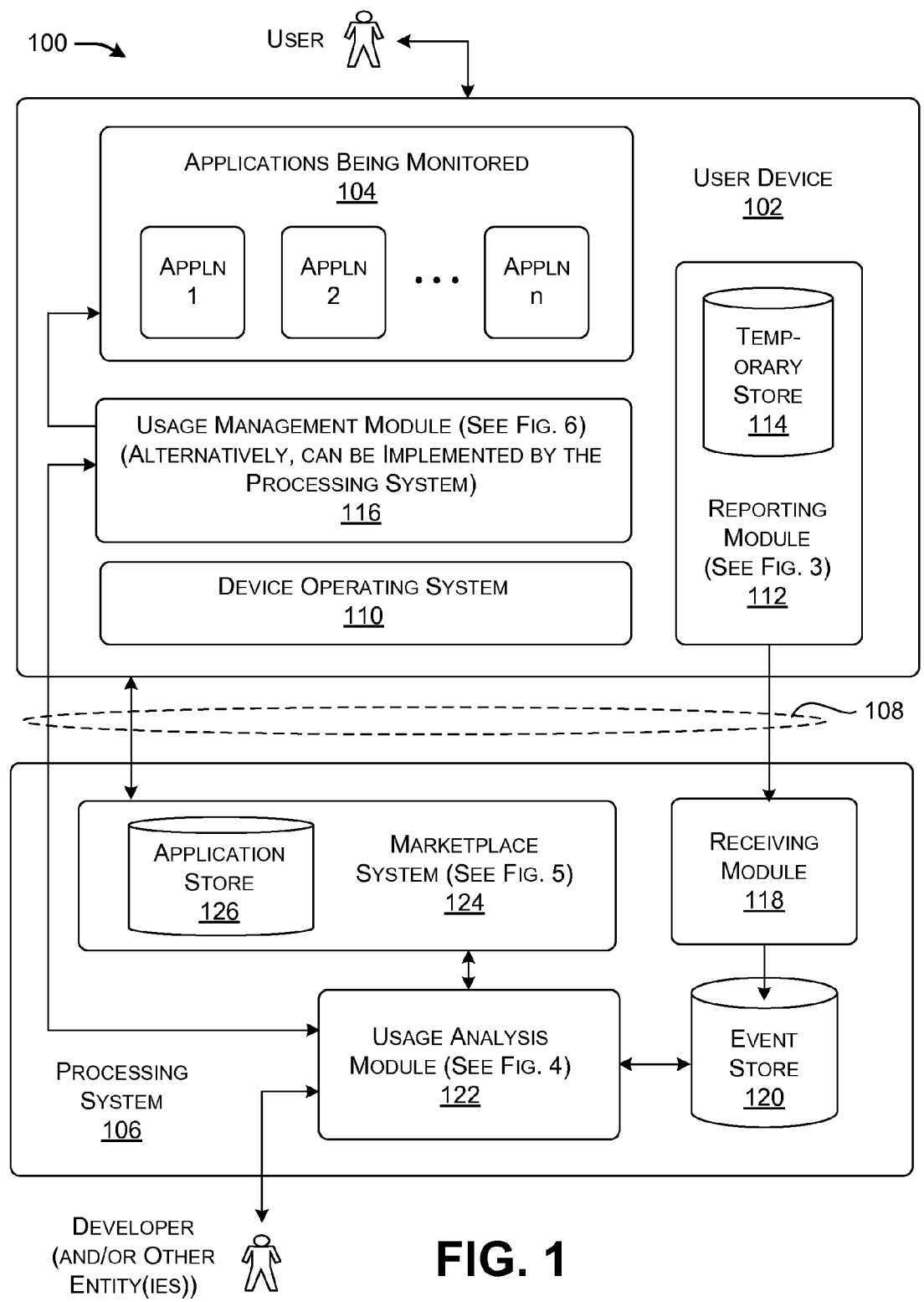
FIG. 1 shows an illustrative environment in which a processing system sends application-level usage information to a user device, based on actual usage data forwarded to the processing system by the user device.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Illustrative Environment FIG. 1 shows an illustrative environment 100 that provides personal usage information to a particular user who is operating a particular user device 102. The user device 102 includes a plurality of applications 104 installed thereon or otherwise accessible to the user. In one case, the personal usage information identifies an amount of data that each of the applications 104 has consumed within a prescribed period of time. For example, the environment 100 can specify that, at a particular time, a first application ("Appln 1") has consumed X amount of data, a second application ("Appln 2") has consumed Y amount of data, a third application ("Appln 3") has consumed Z amount of data, and so on. As used herein, an application that is run by the user device 102 "consumes" data when it causes data to be communicated over wireless communication infrastructure, e.g., either by receiving the data from any remote entity or sending the data to any remote entity. For example, a media-related application that receives and processes a video item consumes an amount of data on that occasion corresponding to the size of the video item.

The environment 100 also provides expected usage information to the user regarding a candidate application that the user has not yet installed on the user device 102 or otherwise run. As used herein, the expected usage information describes an amount of data that the candidate application is expected to consume when it is executed. The environment 100 can derive the expected usage information by monitoring how much data the candidate application consumes when utilized by a group of users (who have used the candidate application). Alternatively, or in addition, the environment 100 can derive the expected usage information based on simulated usage data. The environment 100 may choose to simulate the use of the application when the candidate application has not yet been used by a significant number of users (or by any users). Alternatively, or in addition, a developer who develops an application can provide expected usage information for the application.

The above-summarized application-level dissemination of personal and expected usage information may provide a useful monitoring service with respect to any type of data plan. But the environment 100 may confer particular benefits in those scenarios in which a wireless communication provider (a "provider") places constraints on the amount of data that a user may consume (without paying additional usage-related fees). For example, in some data plans, the provider may allow the user to consume up to a threshold amount of data within a billing cycle without paying additional fees. In a more transaction-based data plan, the provider may ask the user to pay for each individual transaction in which data is consumed.

More specifically, the user can use the personal usage information to gain insight regarding the prior data-consumption demands of the applications 104. Armed with this information, the user can then make intelligent decisions regarding his or her future use of the applications 104. For example, the user may decide to reduce the use of a high-consumption application to avoid depleting a total amount of data that has been allocated by the user's data plan (that is, prior to the end of a billing cycle).

The user can use the expected usage information to gain insight regarding how much a candidate application will consume if placed in use. The user may use this information to forgo using certain applications, or by using certain high-consumption applications in a judicious and measured manner.

In the above examples, the environment 100 assesses the usage of applications based on the amount of data they consume. But, more generally, the environment 100 can assess the usage of applications based on the amount of any resource or resources that the applications consume. For example, the usage of applications can also (or alternatively) be assessed based on the amount of energy they consume (e.g., which may correlate to the applications' respective use of battery resources). In this context, the personal usage information may also (or alternatively) include energy-related personal usage information which reflects the amount of energy that has been consumed by a particular application when used by a particular user. And the expected usage information may also (or alternatively) include energy-related expected usage information which reflects the amount of energy that is expected to be consumed by the candidate application. However, to simplify and facilitate explanation, the following description will mainly assume (unless otherwise expressly noted) that the personal usage information corresponds to data-related personal usage information, and the expected usage information corresponds to data-related expected usage information.

Figure 2:
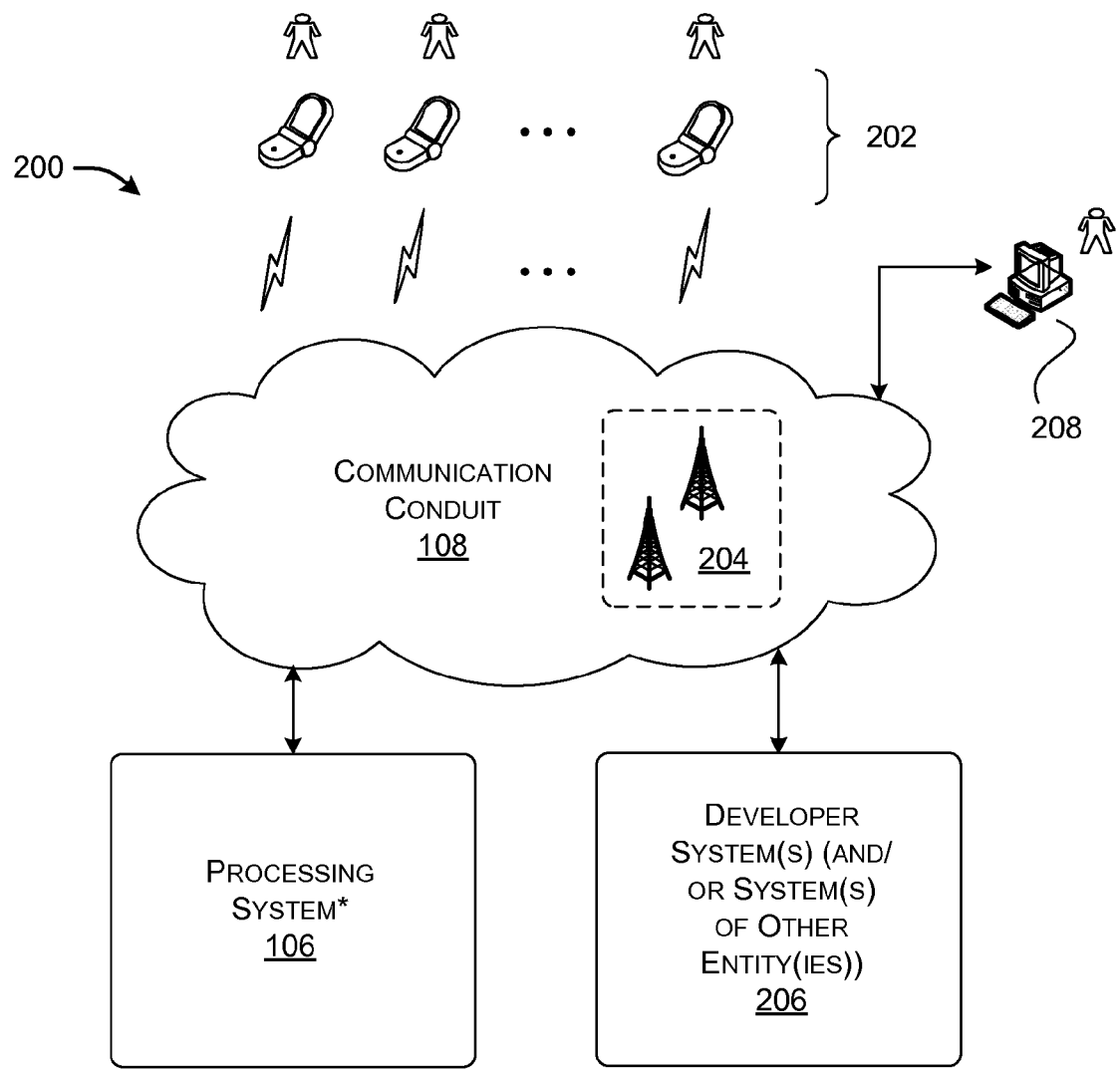
FIG. 2 shows one illustrative implementation of the environment of FIG. 1.

In certain implementations, the environment 100 can provide the above-described services to the user using functionality provided by the user device 102 itself and a processing system 106. In certain physical implementations, the processing system 106 represents functionality that is provided at a remote location with respect to the user device 102. For example, the user device 102 may communicate with the processing system 106 via a communication conduit 108. FIG. 2, described below, provides additional detail regarding this physical implementation of environment 100.

In other physical implementations, at least some of the functions performed by the processing system 106 can be performed by the user device 102 itself (and vice versa). That is, although FIG. 1 shows the processing system 106 and the user device 102 as distinct respective entities, certain functions of the processing system 106 can be considered as components of the user device 102 (and vice versa). Nevertheless, to facilitate explanation, most of the examples which follow make the simplifying assumption that the processing system 106 represents a remote entity with respect to the user device 102.

With the above overview, the following explanation will describe each of the components illustrated in FIG. 1, starting with the user device 102.

The applications 104 represent any type of functionality for performing any respective tasks. In some cases, the applications 104 perform high-level tasks. To cite representative examples, a first application may perform a weather-reporting task, a second application may perform a video presentation task, a third application may perform a text editing task, and so on. In other cases, the applications 104 perform lower-level management or support tasks. For example, some of the applications 104 may represent components of a device operating system 110 of the user device 102. The applications 104 can be implemented in any manner, such as by executable code, script content, etc., or any combination thereof.

FIG. 1 shows that the applications 104 may run on the user device 102. In this implementation, to execute the applications 104, the user device 102 may rely on resources provided by the device operating system 110. In another implementation, the applications 104 may represent remote functionality that is provided, at least in part, by a remote system (such as the processing system 106). For example, at least some of the applications 104 may represent websites, web pages, or web applications, etc. The user device 102 executes an application of this type by accessing it and initiating its functions. To facilitate explanation, however, the description will generally make the simplifying assumption that the applications 104 are installed on the user device 102.

Further, in some cases, an application refers to the entire body of functionality which performs all tasks associated with a main application task. But in other cases, an application may refer to part of a more inclusive body of functionality. For example, consider an application that performs a real estate search function. One sub-application in that main application may perform a mortgage calculation function. Another sub-application in that main application may perform a map search function, and so on.

The user device 102 may also include a reporting module 112. The reporting module 112 captures events that reflect the amount of data that each application is consuming at any given time. According to the terminology used herein, these events constitute actual usage data, where the qualifier "actual" indicates that the usage data reflects the actual use of an application, rather than the simulated use of the application. The reporting module 112 can store the actual usage data in a temporary store 114. The reporting module 112 can then periodically transfer the actual usage data to the processing system 106 for analysis. This disclosure provides additional details regarding the reporting module 112 in the context of the explanation of FIG. 3, below.

The user device 102 also includes a usage management module 116. The usage management module 116 performs various functions which will be described in detail in the context of the explanation of FIG. 6, below. As one function, the usage management module 116 presents personal usage information to a user upon the occurrence of a triggering event. For example, as one type of triggering event, the user may expressly request the personal usage information. Or the user may activate one of the applications 104, which prompts the usage management module 116 to request the personal usage information. As summarized above, the personal usage information itemizes the amount of data that each application has consumed within a specified period of time. Alternatively, or in addition, the processing system 106 can implement the usage management module 116. A user can use his or her user device 102 (or any other device, such as a personal computing device) to access the services associated with the remotely-located usage management module 116.

Now referring to the processing system 106, this functionality includes a receiving module 118 for receiving the actual usage data from a plurality of user devices, including the representative user device 102. The receiving module 118 parses the actual usage data and stores the actual usage data in an event store 120. In the case in which the applications 104 correspond to remote resources (e.g., web pages, etc.), the receiving module 118 can receive the actual usage data from whatever system runs the applications 104.

A usage analysis module 122 retrieves the actual usage data from the event store 120 and performs analysis on this data. For example, among other analysis functions, the usage analysis module 122 generates the personal usage information for a user. In addition, or alternatively, the usage analysis module 122 can derive the expected usage information for each candidate application that a user may download and install in his or her user device. In one implementation, the usage analysis module 122 can generate the personal usage information and the expected usage information in an on-demand manner, e.g., at the time when a user requests this information. Alternatively, or in addition, the usage analysis module 122 can generate the personal usage information and the expected usage information as a background task, that is, prior to the point in time at which this information is requested by a user. This disclosure will provide additional details regarding the functions performed by the usage analysis module 122 in the context of the explanation of FIG. 4, below.

The processing system 106 also may include a marketplace system 124. The marketplace system 124 provides an application store 126 that stores a plurality of candidate applications that can be downloaded (or otherwise utilized) by users upon request by the users. The marketplace system 124 also provides descriptive details regarding each of the candidate applications. A user can review the descriptive details pertaining to a particular candidate application to decide whether it is appropriate to download (or otherwise utilize) that application. Part of the descriptive details identifies the expected usage information for the candidate application. The marketplace system 124 can obtain the expected usage information from the usage analysis module 122. A user can access the marketplace system 124 through the usage management module 116 or through some other access mechanism (besides the usage management module 116). This disclosure will provide additional details regarding the functions performed by the usage marketplace system 124 in the context of the explanation of FIG. 5, below.

FIG. 2 shows one system 200 which implements the environment 100 of FIG. 1. The system 200 includes a plurality of user devices 202 of any type. Any user device may represent any type of computing functionality that has the capability of communicating with a remote entity via wireless communication. For example, any user device may represent any type of portable device having a wireless communication interface, including a cellular telephone of any type (e.g., a smart phone), a personal digital assistant device, an electronic book reader device, a portable game console device, a laptop or netbook-type computing device of any size, a tablet-type device, a vehicle-borne navigation device, and so on. Alternatively, the user device may represent any type of traditionally stationary computing device having a wireless communication interface, such as a personal computer, a game console device, a set-top box device, and so forth.

The communication conduit 108 can represent any mechanism or combination of mechanisms that allows the user devices 202 to communicate with remote entities (and to communicate with each other). Generally stated, the communication conduit 108 can represent any local area network, any wide area network (e.g., the Internet), or any combination thereof. The communication conduit 108 can be governed by any protocol or combination of protocols.

At least part of the communication conduit 108 can be implemented by wireless communication infrastructure 204. In one case, the wireless communication infrastructure 204 can represent a collection of cell towers, base stations, satellites, etc. The wireless communication infrastructure 204 can be administered by one or more wireless communication providers. Each provider may interact with its customers using prescribed protocols and formats. The communication conduit 108 can also include wired network infrastructure.

In one implementation, the processing system 106 may represent one or more server computing devices and associated data stores (and other electronic equipment). The processing system 106 can be implemented at a single site or can be distributed over multiple sites. Further, the processing system 106 can be administered by a single entity or by multiple entities. For example, in one case, a single physical system can implement both the usage analysis module 122 and the marketplace system 124. In another case, two or more systems can implement the usage analysis module 122 and the marketplace system 124. Further, as explained above, any functions described as being performed by the remote processing system 106 can instead (or in addition) be performed by the user devices 202, and vice versa.

The system 200 can also include one or more other systems 206 that may interact with the processing system 106 and/or the user devices 202. For example, the other systems 206 can include computer infrastructure maintained by an application developer. The developer can use its computer infrastructure to access the processing system 106 to obtain detailed usage information regarding the usage-related behavior of an application that is has developed. Based on this insight, the developer may decide to modify its application in any manner. For example, the developer may modify the application to improve the efficiency at which it consumes data.

Finally, FIG. 2 shows that any user can use any separate user device 208 to access usage information provided by the processing system 106, e.g., by accessing a remote service provided by the processing system 106. For example, the user device 208 may represent a personal computing device that the user uses to access online-usage data, whereas the user uses a smart phone to actually run applications and consume data under his or her plan. In this scenario, the user device 208 may not have a usage management module 116 installed thereon.

Figure 3:
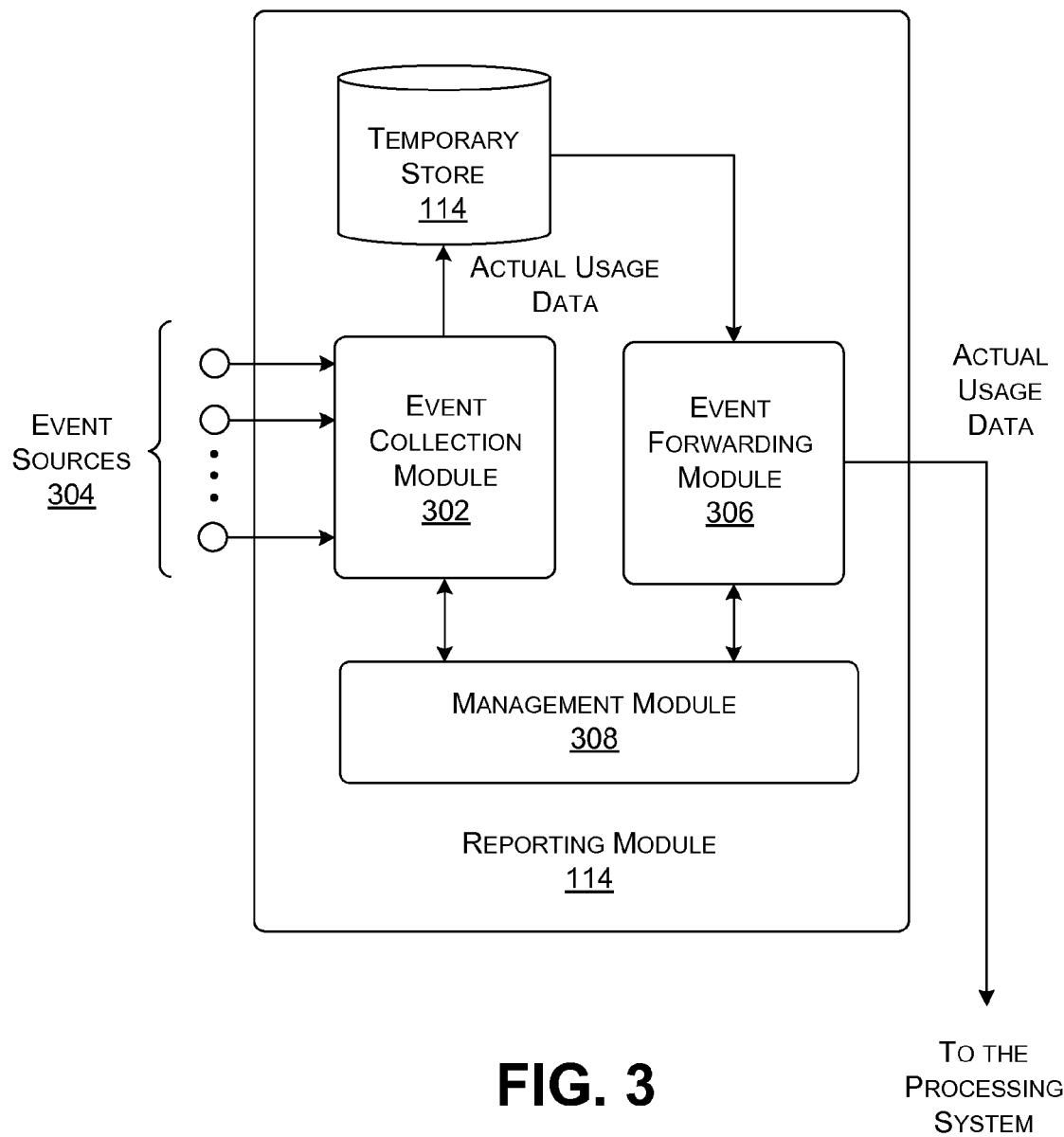
FIG. 3 shows one illustrative implementation of a reporting module that may be used in the environment of FIG. 1.

FIG. 3 shows one illustrative implementation of the reporting module 112 introduced in the context of the description of FIG. 1. The reporting module 112 includes an event collection module 302 for collecting actual usage data from one or more event sources 304, e.g., either on a pull basis, a push basis, or combination thereof. The event sources 304 correspond to any type of mechanisms within the user device 102 that capture information that evidences the consumption of data by the user device 102. For example, in some cases, the event sources 304 may pertain to event-generating instrumentation code added to applications, operating system functionality, and/or other components of the user device 102.

The actual usage data that is collected can encompass different types of data. One type of actual usage data describes socket-related activity performed by the user device 102. Another type of actual usage data conveys application information (which identifies each application that is being executed at a given time). Another type of actual usage data conveys network interface information (which identifies the type of network interface mode that each application is using to interact with a remote entity, such as 3G or WiFi). Other types of actual usage data may describe push notification activity, background transfer service activity, video streaming activity, and so on. The above-described types of actual usage data are representative, not exhaustive; other implementations can collect additional types of actual usage data, or omit one or more types of actual usage data mentioned above.

In the above-described implementation, the event collection module 302 collects the actual usage data solely based on activity that occurs within the user device 102. In addition, or alternatively, other entities within the environment 100 can collect information that reflects the consumption of data by an application running on a user device. For example, any entity that is part of the wireless communication infrastructure 204 can also collect actual usage data. Alternatively, or in addition, the processing system 106 can collect actual usage data, particularly in those cases in which an application is a remote application that actually runs on the processing system 106, rather than on the user device 102. Nevertheless, to facilitate explanation, it will henceforth be assumed that the environment 100 collects the actual usage data from the user devices.

As described above in connection with FIG. 1, the event collection module 302 stores the actual usage data in a temporary store 114. An event forwarding module 306 can compress the actual usage data stored in the temporary store 114 (before or after storage of the data). Then, at a prescribed reporting time (e.g., every 30 minutes in one merely representative case), the event forwarding module 306 can transfer the compressed actual usage data to the processing system 106. The event forwarding module 306 can perform this transfer via the communication conduit 108, which, as said, may rely on the services of the wireless communication infrastructure 204.

A management module 308 generally governs the operation of the reporting module 112. For example, the reporting module 112 can maintain a registry of available event sources 304. Based on configuration information, the reporting module 112 can then activate or deactivate individual event sources. If deactivated, an event source will not contribute actual usage data that is stored in the temporary store 114.

The reporting module 112 can use various mechanisms to implement the reporting module 112. For example, in one non-limiting implementation, the reporting module 112 can use Event Tracing for Windows® (ETW) to implement the reporting module 112, provided by Microsoft® Corporation of Redmond, Wash. ETW represents kernel-level functionality for logging events, typically employed for debugging or testing the performance of applications.

Figure 4:
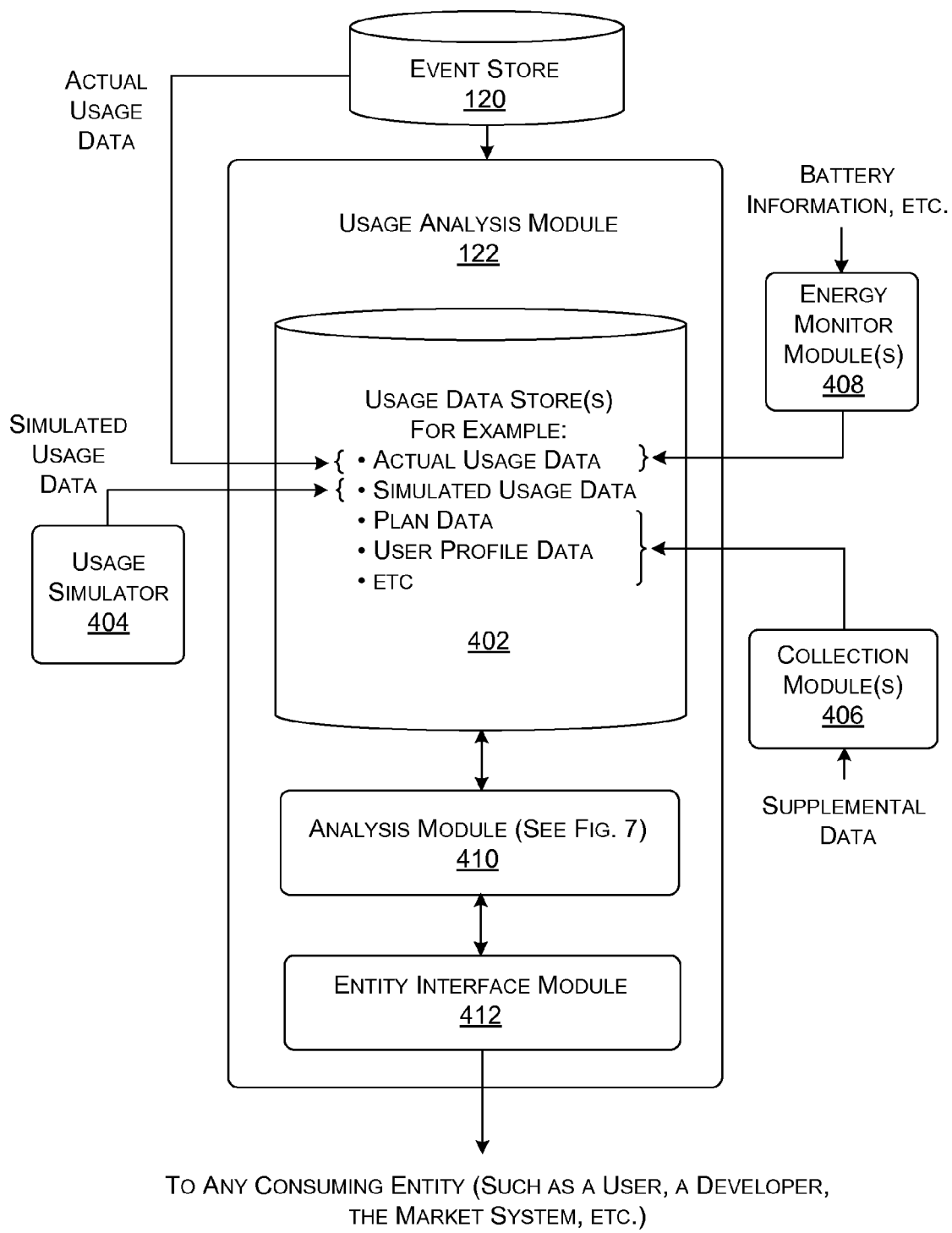
FIG. 4 shows one illustrative implementation of a usage analysis module that may be used in the environment of FIG. 1.

FIG. 4 shows one illustrative implementation of the usage analysis module 122 provided by the processing system 106. The usage analysis module 122 can maintain a usage data store 402 that stores usage data. As used herein, usage data refers to any information that the usage analysis module 122 can use to generate personal usage information or expected usage information (and other types of usage information). For example, the reporting module 112 of each user device can provide actual usage data which contributes to the usage data that is stored in the usage data store 402.

In addition, or alternatively, a usage simulator 404 can simulate the use of an application. This operation provides simulated usage data that contributes to the usage data stored in the usage data store 402. In one implementation, the usage simulator 404 can correspond to an emulator which runs on the processing system 106. Alternatively, or in addition, the usage simulator 404 can correspond to testing functionality that runs on one or more actual user devices (where the user devices function, in this circumstance, in a simulation mode of operation). In either case, the usage simulator 404 may operate by automatically invoking functionality provided by an application, thereby simulating the manner in which an actual user would manually utilize the application. The usage simulator 404 can use any simulation routine to simulate an application, including a routine that applies a predefined sequence of activations, a routine that applies a random selection of activations, or a combination thereof. A reporting module (not shown) can then collect simulated usage data which expresses the data consumed during the simulation operation. As will be described below, the usage analysis module 122 can rely on the simulated usage data in those cases in which actual usage data is not available, or is not available in suitable abundance.

Another collection module 406 can collect supplemental usage data and add that data to the usage data store 402. More specifically, the supplemental usage data provides information which has a bearing on the computation of personal and expected usage information (and other usage information), but does not directly express the consumption of data. For example, the collection module 406 can collect user profile data for users who operate the user devices 202. For each user, the user profile data expresses the manner in which the user typically interacts with applications. As will be described below, the usage analysis module 122 can use the user profile data to generate usage information which is particularly germane to the behavior of individual respective users.

In one case, the collection module 406 can glean the user profile data from the actual usage data collected in the manner described above (e.g., as described with reference to FIG. 3). For example, based on the actual usage data, the collection module 406 can determine the types of actions that a user typically performs while interacting with an application, the frequency at which the user performs those actions, and the amount of data consumed by those actions. The collection module 406 can then formulate user profile data which classifies the behavior of the user based on this type of evidence. The collection module 406 can also provide information which qualifies the consumption-related behavior of each user, such as by identifying the terms of the data plan under which the user has consumed the data.

More specifically, the collection module 406 can formulate the user profile data for a user in any level of granularity. In one case, the collection module 406 provides user profile data which classifies the amount of data that a user typically consumes while using applications, without discriminating between different types of applications. For example, the user profile data for a user may classify the user as a high-consumption data user because that user has a demonstrated proclivity to consume large-content items (such as video items) while using applications in general; in addition, or alternatively, that user may be regarded as a high-consumption data user because he or she sends and/or receives a large quantity of messages while using applications in general, and so on.

In another case, the collection module 406 can determine the user's consumption-related behavior in the course of interacting with different types of applications. For example, the collection module 406 can determine the frequency at which the user downloads large-content items while using social networking applications, as opposed to news-related applications. Based on this insight, the collection module 406 can classify the user's behavior with respect to different types of applications. For example, the user's profile data may indicate that the user is a high-consumption data user with respect to social networking applications, but a medium-consumption data user with respect to all other types of applications. The collection module 406 can use any other criterion or criteria to categorize some aspect of the consumption-related behavior of each user.

In the above examples, the collection module 406 derives the user profile data for a user based on a direct evidence of the amount of data that the user consumes while using applications. Alternatively, or in addition, the collection module 406 can use indirect factors to gauge the user's proclivity to consume data while using an application. Representative factors include the number of contacts that the user maintains on a social networking site, the number of Email accounts that the user syncs together while using certain applications, demographic information regarding the user (such as age, place of residence, organizational affiliations, etc.), and so on.

The collection module 406 can also collect plan data for each user that expresses the nature of the data plan that governs the user's consumption of data. For example, the plan data for a particular user may describe the billing cycle for that user, the data limits for that user, and so on. The collection module 406 can obtain the plan data in different ways. In one approach, the collection module 406 can obtain the plan data from a user when the user manually provides this information. In another approach, the collection module 406 can obtain a user's plan data from whatever entity administers the plan, such as a wireless communication provider that provides service to the user. For example, the collection module 406 can query the wireless communication provider by sending a particular request message. That request message, for example, can be formulated as an SMS message or the like. The wireless communication provider responds by providing plan data for the user. In another approach, the collection module 406 may communicate directly with a billing system of the wireless communication provider. As will be described below, the usage analysis module 122 can formulate the usage information in relation to the plan data. This gives the user an appreciation of the consequences of his or her data usage in the context of the constraints imposed by his or her data plan.

The examples of supplemental usage data provided above are representative, not exhaustive. That is, the collection module 406 can collect additional types of supplemental data which has a bearing on the analysis performed by the usage analysis module 122.

An energy monitor module 408 can optionally also provide energy-related actual usage data (whereas the usage data described so far pertains to data-related actual usage data). More specifically, an application may perform various functions, such as powering up the display, using the CPU, and transferring information over a network. The energy monitor module 408 can measure the amount of energy that each of these functions consumes, and then sum up all of these energy expenditures to provide an indication of the total amount of energy that has been consumed by the application. The energy monitor module 408 can measure energy expenditure in various ways, such as by monitoring battery voltage level or some other battery-related metric. Alternatively, or in addition, the energy monitor module can use models to convert loads placed on different components of the mobile device 102 into energy expenditures. The usage analysis module 116 can use the energy-related usage information to provide energy-related personal usage information and energy-related expected usage information. (However, to simplify the explanation, the environment 100 of FIG. 1 will continue to be mainly described based on the assumption that the actual usage data measures the consumption of data, not energy.) Note that an application's consumption of energy implicates all processes that the application performs, not just the transfer of data via a network. However, it is also possible to generate an energy measurement that pinpoints the amount of energy an application consumes sending and receiving data over a network.

The usage analysis module 122 also includes an analysis module 410 for deriving the personal usage information and/or the expected usage information based on the usage data described above. The manner in which the analysis module 408 performs this function will be set forth below in the context of the explanation of FIG. 7.

Finally, the usage analysis module 122 can include an entity interface module 412. The entity interface module 412 provides interface functionality which allows any entity to interact with the usage analysis module 122. Such entities can include any user device, a developer system (administered by a developer), and so on.

Figure 5:
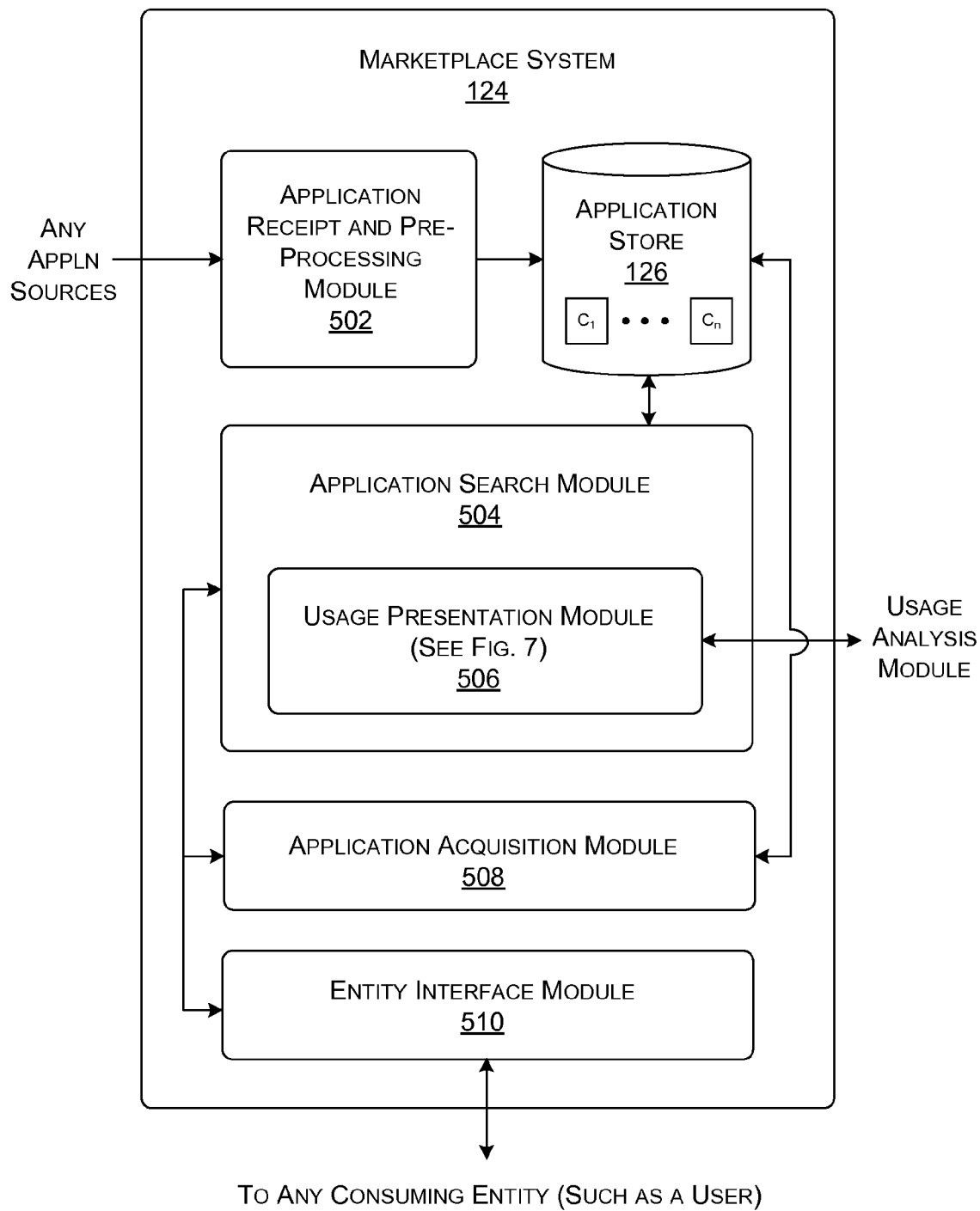
FIG. 5 shows one illustrative implementation of a marketplace system that may be used in the environment of FIG. 1.

FIG. 5 shows one illustrative implementation of the marketplace system 124 provided by the processing system 106 or some other component within the environment 100. The marketplace system 124 may represent one or more server computers and associated data stores.

The marketplace system 124 includes an application receipt and pre-processing module 502 (simply "receipt module" 502 below for brevity). The receipt module 502 can receive applications of any type from any sources for storage in the application store 126. For example, the receipt module 502 can receive applications from ordinary end users, professional application developers, and so on. The receipt module 502 can also perform optional pre-processing on the applications prior to storage; for example, the receipt module 502 can analyze the applications to determine whether they pose a security threat. The applications stored by the application store 126 are referred to as candidate applications because these applications are candidates for downloading by the users (and/or online use by the users). The marketplace system 124 can also store descriptive metadata associated with each candidate application.

The marketplace system 124 also includes an application search module 504. The search module 504 allows a user to navigate within the application store 126 to find a candidate application that meets his or her needs. Such navigation is performed on the basis of the descriptive metadata associated with the candidate applications. For example, a user can use the application search module 504 to browse through different categories of applications. Alternatively, or in addition, the user can use the application search module 504 to identify applications that satisfy a specified search term, and so on. Upon identifying a potentially suitable candidate application, the application search module 504 can supply the user with any level of descriptive detail regarding the candidate application.

For example, as one category of detail, a usage presentation module 506 can reveal the expected usage information associated with a candidate application. As described above, the expected usage information describes the amount of data that an application is expected to consume when used by a particular user. The examples which follow clarify the manner in which the environment 100 can derive and apply the expected usage information.

An application acquisition module 508 allows a user to acquire an application that satisfies the user's needs. For example, the user can interact with the application acquisition module 508 to purchase and download an application (or otherwise gain access to the application), or to simply download or access the application if it is available free of charge.

Finally, an entity interface module 510 provides an interface that allows any entity to interact with the marketplace system 124. One such entity may correspond to an individual user who is operating his or her user device.

Figure 6:
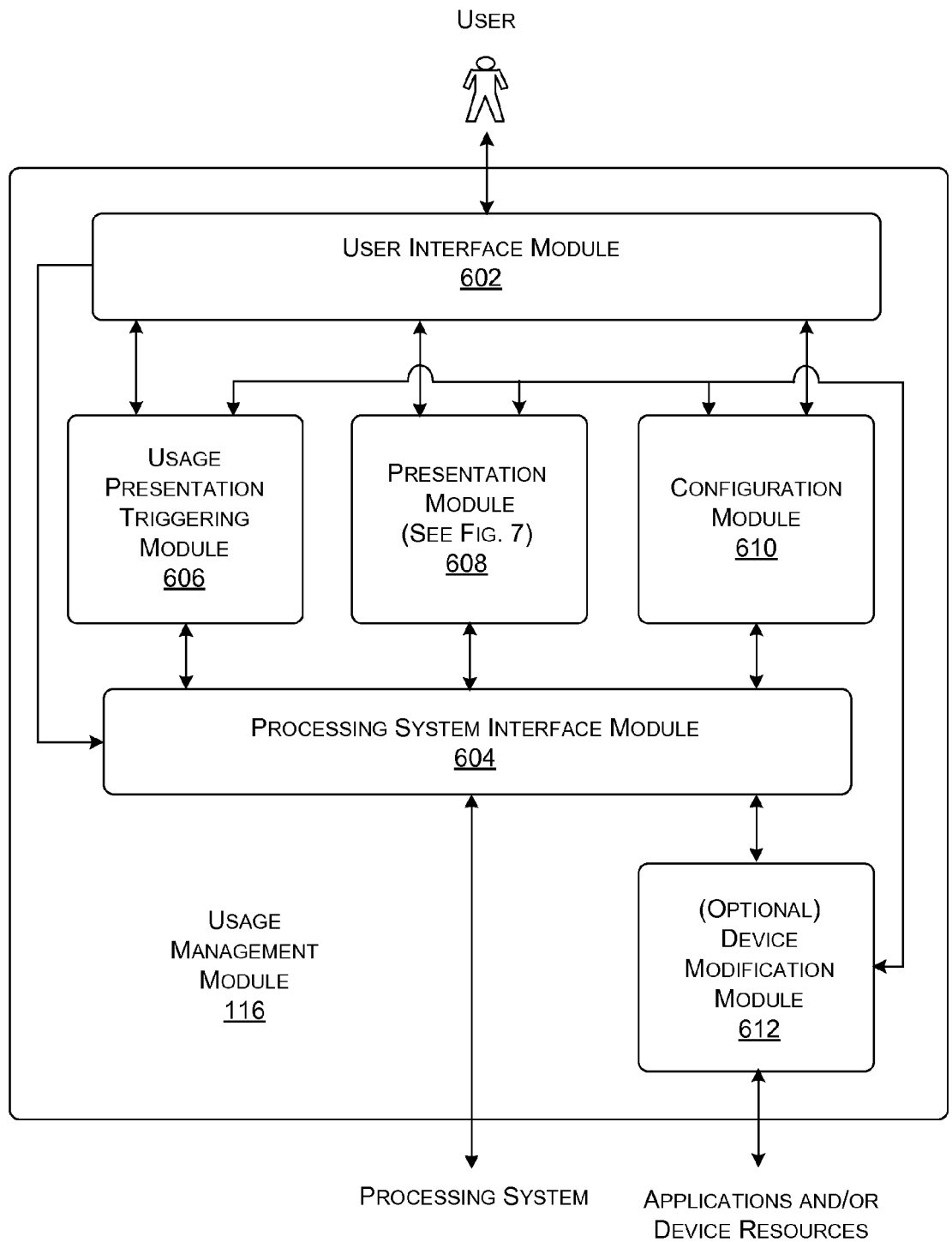
FIG. 6 shows one illustrative implementation of a usage management module that may be used in the environment of FIG. 1.

FIG. 6 shows one illustrative implementation of the usage management module 116 provided by each user device, such as the representative user device 102 of FIG. 1. The usage management module 116 generally performs all functions of the user device 102 which have a bearing on the presentation of usage information. Alternatively, one or more aspects of the usage management module 116 can be performed by the processing system 106. This is the case, for instance, when the usage management functionality is implemented as an online service.

The usage management module 116 includes a user interface module 602 for interacting with the user. For example, the user interface module 602 may include functionality for displaying information to the user via a device screen and/or other output mechanism(s). The user interface module 602 may also include functionality for receiving information from a user, e.g., via a keypad, a touch-sensitive input screen, a mouse device, and/or other input mechanism(s).

A processing system interface module 604 allows the usage management module 116 to exchange information with the processing system 106 and/or any other entity within the environment 100. For example, the usage management module 116 can receive personal usage information and/or expected usage information from the processing system 106 via the processing system interface module 604.

Generally, the usage management module 116 can exchange data with the processing system 106 via any transmission mechanism, such as, but not limited to, an SMS transmission mechanism. Further, the wireless communication infrastructure 204 which couples the usage management module 116 to the processing system 106 may specify the use of certain formats and protocols. In view thereof, the processing system 106 can parse and structure the information that it sends to the usage management module 116 in an appropriate provider-specific manner.

The usage management module 116 can include a usage presentation triggering module 606. As the name suggests, the usage presentation triggering module 606 detects when an event has occurred which triggers the presentation of usage information. In one case, the usage presentation triggering module 606 triggers the presentation of personal usage information when the user explicitly requests this information or when the user activates an application. In another case, the processing system 106 provides expected usage information when the user accesses the marketplace system 124.

A presentation module 608 controls the manner in which usage information is displayed to a user (or presented to the user in some other form). For example, as will be described in greater detail below, the presentation module 608 can present the usage information in textual form, graphical form, or some combination thereof.

A configuration module 610 allows the user to configure the manner in which the usage management module 116 operates. According to one option, for instance, the configuration module 610 can allow the user to set individual application-specific quotas for different applications. An application-specific quota describes how much a given application is permitted to consume within a billing cycle. The usage management module 116 can perform various environment-specific actions when the user exceeds an application-specific quota for a billing cycle, such as by issuing a warning or other informational message, or prohibiting the use of the application, and so on.

Finally, an optional device modification module 612 can govern operation of an application based on usage information (and/or based on the raw actual usage data). For example, the device modification module 612 can monitor the amount of data that a particular application has consumed. If the usage exceeds a prescribed threshold or exhibits other threshold behavior, the device modification module 612 can change the way that the application operates to make it more efficient in its consumption of data. For example, the device modification module 612 can reduce the resolution of video items that are being presented to the user. Alternatively, or in addition, the device modification module 612 can disable or otherwise limit the use of certain application features that consume a significant amount of data. For example, the device modification module 612 can disable or restrict the ability of an application to present ads to a user during use. More specifically, in some cases, the device modification module 612 can make a change by modifying an application itself. Alternatively, or in addition, the device modification module 612 can make a change by modifying other resources provided by the user device 102, on which the application relies.

As a footnote, FIG. 1 shows that the reporting module 112 and the usage management module 116 represent separate components. However, in another implementation, the reporting module 112 may represent a component within the usage management module 116.

Figure 7:
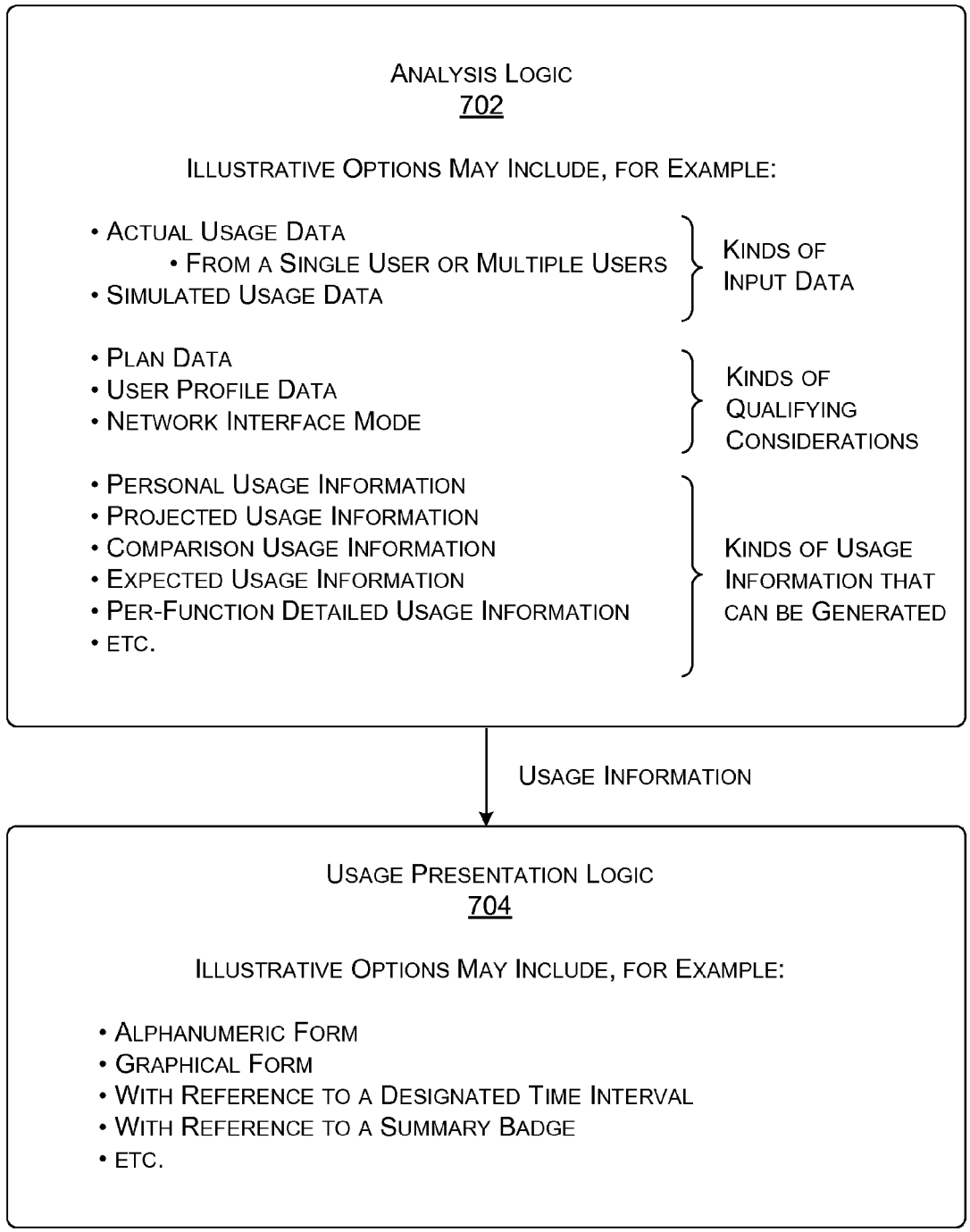
FIG. 7 shows one illustrative implementation of analysis logic and usage presentation logic that may be used in the environment of FIG. 1.

FIG. 7 shows a high-level view of analysis logic 702 and usage presentation logic 704. The analysis logic 702 performs analysis on usage data to derive usage information (e.g., either personal usage information or expected usage information). The usage presentation logic 704 formulates the usage information into a particular form for presentation to a user. Different components within the environment 100 of FIG. 1 can implement the analysis logic 702 and the usage presentation logic 704. For example, FIG. 4 shows that the usage analysis module 122 can employ an analysis module 410 that can implement aspects of the analysis logic 702. FIG. 5 shows that the marketplace system 124 can employ a presentation module 506 that can implement aspects of the usage presentation logic 704. And FIG. 5 shows that the usage management module 116 can employ a presentation module 608 that also employs aspects of the usage presentation logic 704. More generally stated, the environment 100 can distribute the analysis logic 702 and the usage presentation logic 704 to different components of the environment 100 in any manner based on any environment-specific considerations. As such, any of the analysis and presentation functions described herein can be performed locally and/or remotely with respect to a user device. In the following description, the term "particular user" refers to the user for whom the usage information (e.g., either the personal usage information or the expected usage information) is provided. Other users besides the particular user are "other users."

FIG. 7 identifies various options that govern the operation of the analysis logic 702. For example, FIG. 7 indicates that the analysis logic 702 can generate usage information based on various types of input data. One type of input data corresponds to actual usage data. In most of the examples that follow, the actual usage data corresponds to data-related actual usage data; but it can alternatively, or in addition, correspond to energy-related usage data. Another type of input data corresponds to simulated usage data. Although not enumerated, the analysis logic 702 can depend on yet further types of input data.

FIG. 7 also indicates that the analysis logic 702 can generate usage information based on various types of qualifying considerations. One type of qualifying consideration corresponds to plan data which specifies a manner in which a user is permitted to consume data based on a contractual data plan. Another type of qualifying consideration corresponds to user profile data which characterizes the manner in which users typically consumes data while using applications. Although not enumerated, the analysis logic 702 can depend on yet further types of qualifying considerations.

FIG. 7 also indicates that the analysis logic 702 can generate different types of usage information. In one case, for instance, the analysis logic 702 can generate personal usage information which reflects the amount of data that each application installed on the user device 102 has consumed within a prescribed period of time. In another case, the analysis logic 702 can present the personal usage information in conjunction with projected usage information. The analysis logic 702 can form the projected usage information by extending or extrapolating the personal usage information into the future, based on the assumption that the user's future consumption of data will resemble the user's recent consumption of data.

In another case, the analysis logic 702 can present comparison usage information in conjunction with the personal usage information. The analysis logic 702 can provide the comparison usage information as a benchmark against which a user can evaluate his or her personal usage information. In one implementation, the analysis logic 702 can compute the comparison usage information for a particular application for a particular user (who operates a particular user device) by processing the actual usage data provided by a group of other user devices which also run the particular application. As will be described below, this processing of usage data can be performed in various ways, e.g., by forming an average or a median value, etc.

In another case, the analysis logic 702 can generate expected usage information which refers to the amount of data that a candidate application is expected to consume when it is used by a particular user. The analysis logic 702 can form the expected usage information in the same manner as the comparison usage information, e.g., by processing the actual usage data provided by a group of user devices which have run the candidate application. Alternatively, or in addition, the analysis logic 702 can form the expected usage information based on simulated usage data (at least in part). Alternatively, or in addition, a developer who develops an application can provide expected usage information for the application.

The analysis logic 702 can also optionally tailor the comparison usage information and the expected usage information in a manner which takes account of the user profile data associated with the particular user who will receive the usage information, as well as the user profile data associated with a group of other users.

In another case, the analysis logic 702 can generate per-function detailed usage information. This usage information identifies the amount of data consumed by individual functions within a particular application that involve wireless communication. In one scenario, a developer may request this type of information to gain insight regarding how the application may be modified to improve its efficiency.

Further, any of the categories of usage information described above can be expressed in the context of energy usage, as opposed to data usage (or in addition to data usage). For example, the analysis logic 702 can generate energy-related personal usage information and energy-related expected usage information. And this energy-related information can be tailored based on user profile data in the manner described above.

FIG. 7 also identifies various options that govern the operation of the usage presentation logic 704. For example, as stated above, the usage presentation logic 704 can present the usage information in alphanumeric form or graphical form, or combination thereof. The usage presentation logic 704 can also present the usage information with reference to any time interval, such as a monthly billing cycle. In some cases, the usage presentation logic 704 can also express the usage information in summary form, e.g., as a summary badge.

FIGS. 8-15 depict examples of the output of the analysis logic 702 and the usage presentation logic 704. In each case, the user device 102 may present the output on a display screen 802 of the user device 102. For example, in the case of a smart phone or the like, the display screen 802 may also function as a touch-sensitive input mechanism. The user may physically interact with the display screen 802 to navigate within the services provided by the usage management module 116. Alternatively, or in addition, the user can use a personal computing device or some other stationary computing device to access the usage information.

In scenarios A-G (in FIGS. 8-10), the environment 100 presents personal usage information to the particular user who is using the user device 102. The personal usage information itemizes how much data each application that is installed on (or otherwise accessible to) the user device 102 has consumed thus far within a current billing cycle. Scenarios A-G convey this information in different ways, described below. Although the various scenarios adopt different respective presentation strategies, any scenario can combine two or more of the presentation strategies described herein.

In scenario A, the environment 100 presents a single value for each application. That single value identifies the amount of data that each application has consumed within the current billing cycle.

In scenario B, the environment 100 presents two values for each application. A first value identifies how much data an application has consumed using a first network interface mode (e.g., 3 G communication), while a second value identifies how much data the application has consumed using a second network interface mode (e.g., WiFi communication) (where 3 G communication is typically more expensive than WiFi communication). Although not shown, the environment 100 can also identify the particular network entities that are associated with any network interface mode. For example, assume that a user regularly uses a first wireless communication provider when using his user device in his home state, but uses a second wireless communication provider when at a business site in another state. In this circumstance, the environment 100 can break down the cellular data usage for each wireless communication provider.

In scenario C, the environment 100 presents a single value that identifies the amount of data that each application has consumed; but in this case, the environment 100 also conveys the application-specific quota for the application. The user (or other entity) may specify this application-specific quota via the configuration module 610 of FIG. 6.

Scenario D (in FIG. 9) uses a graphical format to convey the amount of data that an application has consumed, relative to a total amount of data that has been allocated to the application, e.g., as expressed by the application-specific quota described above. In this example, the environment 100 uses a pie chart to convey the fraction of the application-specific quota that has been consumed by the application, but the environment 100 can use any other suitable graphical format or combination of formats (such as a bar chart or the like) to convey this information.

In scenario E, the environment 100 also conveys the amount of data that an application has consumed in graphical form. But in scenario E, the environment 100 also extends the personal usage information to provide an indication of when the user is expected to reach the application-specific quota for the application. This extrapolation makes the assumption that the user will continue using the application in the same manner that he or she has up to the present point in time. Scenario E also shows a descriptive text caption which explains the salient features of the graphical depiction. According to the terminology used herein, the information which conveys the estimated future consumption of data by an application constitutes projected usage information.

Scenario F (in FIG. 10) uses a single value to convey the amount of data that each application has consumed within a current billing cycle. In addition, the environment 100 can provide a single value for each application which conveys the amount of data that other users have consumed while using this same application. According to the terminology used herein, information which relates to the data consumption of other users constitutes an example of comparison usage information. Scenario F presents the personal usage information and comparison usage information in textual form, but this information can also be presented in graphical form (e.g., in bar chart form or the like).

In one case, the environment 100 can form comparison usage information for a particular application by collecting actual usage data from a group of user devices (operated by other users) which have used the particular application. The environment 100 then processes the actual usage data that has been collected to form the comparison usage information.

The processing can take various forms. For example, the environment 100 can present an average value which describes the average actual data usage of the particular application by the group of user devices. In addition, the environment 100 can present a standard deviation value which describes a standard deviation associated with the average usage value. In addition, or alternatively, the environment 100 can present a median value which describes a median actual data usage of the particular application by the group of user devices. In addition, or alternatively, the environment 100 can present distribution information which represents a distribution of data usage readings received from individual user devices in the group of user devices. These scenarios are presented by way of example, not limitation; other implementations can perform processing on a collection of usage data in other ways.

Scenario G also expresses personal usage information in conjunction with comparison usage information. But in this case, the environment 100 biases the comparison usage information in a manner to reflect the consumption-related behavior of the particular user (who receives the information shown in FIG. G), as reflected by user profile data associated with this user. The environment 100 can perform this biasing or tailoring in different ways. In one implementation, the environment 100 can first classify the consumption-related behavior of the particular user. More specifically, in one case, the environment 100 can determine the consumption-related behavior of the user with respect to all applications with which the user has previously interacted, without discriminating between different classes of applications. In another case, the environment 100 can determine the user's consumption-related behavior with respect to a particular class of applications with which the user has previously interacted. For example, assume that the environment 100 seeks to generate comparison usage information for a particular application, e.g., "Appln A." The environment 100 can determine that Appln A is a social networking application. The environment 100 can then classify the consumption-related behavior of the user based on the manner in which the user has interacted with Appln A as well as other social networking applications.

After classifying the particular user, the environment 100 can present comparison usage information which is germane to the particular user's identified class of consumption-related behavior. For example, assume that environment 100 determines, over a span of time, that the user corresponds to a high-consumption data user. The environment 100 can then present comparison usage information for a particular application (e.g., "Appln A") which describes or approximates the manner in which other high-consumption data users have used Appln A.

The environment 100 can express or approximate the behavior of other users in various ways. In one approach, the environment 100 can identify a subset of other data users who have used Appln A and who have also been classified as high-consumption data users (based on their respective user profile data). More specifically, in a first case, these other users may correspond to high-consumption data users due to their high consumption of applications in general; in a second case, these users may correspond to high-consumption data users due to their consumption of applications in the same class as Appln A. The environment 100 can then express the comparison usage information as the average value of the consumption exhibited by this subset of users, or by using some other metric.

In another case, the environment 100 can form a distribution of consumption readings for all users who have used Appln A. The environment 100 can then form the comparison usage information by extracting a representative data usage reading from the high range end of that distribution.

In yet another case, the environment 100 can form the comparison usage information by averaging the consumption of all users who have used Appln A and then adding a fixed offset to this value to reflect that the particular user is a high-consumption data user. Still other approaches can be applied to compute the comparison usage information.

In any of the examples set forth above, the environment 100 can also take the data plans of users into account when generating comparison usage information (where plan data may be regarding as a component of the user profile data associated with the users). That is, a user's consumption-related behavior is influenced by the contractual terms under which a user is allowed to consume data. For instance, a user who has a relatively high per-month limit can be expected to be more liberal in his or her utilization of applications compared to a user who pays for data usage on a per-transaction basis. Hence, the environment 100 can ascertain the data plan that governs the particular user's consumption of data, and then formulate comparison usage information from a subset of users who share the same data plan. This provides a more robust identification of the users who are the true peers of the particular user.

In yet another strategy, the environment 100 can form comparison usage information by giving the user an indication of how much data he or she has consumed while using applications of the same type as Appln A. For example, if Appln A is a social networking application, the environment 100 can form comparison usage information which gives the user an indication of how much data, on average, the user has consumed while using other social networking applications. This comparison usage information thereby reveals how efficient the particular application is with respect to other applications that perform the same basic function. This type of comparison usage information may be based on just the behavior of the particular user, but it can also take into consideration the usage behavior of other users.

Advancing to FIG. 11, this figure shows one manner by which the environment 100 can present expected usage information (regarding a candidate application that may not yet have been downloaded to the user's user device 102). The environment 100 can present the expected usage information to a particular user when that user accesses the marketplace system 124. For example, at some point in the user's exploration of the available applications, assume that the environment 100 presents a page 1102 to the user that provides various descriptive details regarding a particular candidate application. One item may provide a textual description of the candidate application. Another item may provide a review of the candidate application. Another item may invite the user to download or otherwise acquire the application. Another item may invite the user to investigate the expected usage characteristics of the candidate application. The user may wish to review this usage information to determine the manner in which the installation of the application will affect the user's data consumption budget.

Assume that the user opts to investigate the usage information associated with the candidate application, e.g., by clicking on the "Usage Characteristics" link in page 1102. The environment 100 responds by displaying the extended usage information in various environment-specific ways, some of which are enumerated in FIG. 11.

For instance, in scenario 1104, the environment 100 can form the expected usage information for a candidate application by collecting and processing the actual usage data provided by user devices which have already used the candidate application. In scenario 1104, the environment 100 expresses the result of its processing as one or more values, e.g., by providing any of an average value, a standard deviation value, a median value, and so on, or combination thereof. In other words, the environment 100 can form the expected usage information in the same way that it forms the comparison usage information in scenario G above.

In scenario 1106, the environment 100 can again convey the expected usage information using one or more values. But in this case, the environment 100 presents expected usage information that is tailored to the usage habits exhibited by the particular user (who will receive the expected usage information). The environment 100 can formulate this biased expected usage information in any of the ways described above with respect to scenario G. That is, the environment 100 can assess the usage-related behavior of the particular user, either in an application-agnostic manner (without isolating the user's behavior with respect to different classes of applications) or in an application-specific manner (by selectively considering the user's behavior with respect to a specific class of applications to which the candidate application belongs). (In this case, however, the environment 100 does not consider the manner in which the user has interacted with the candidate application, because the user has not yet had an opportunity to interact with this application.) In one case, the environment 100 can then generate the expected usage information based on the data usage of other users who share the particular user's data consumption habits (as reflected by their user profiles), and who have also used the candidate application in question. In addition, the environment 100 can generate the expected usage information by considering only those other users who are governed by the same type of data plan as the particular user.

In scenario 1108, the environment 100 can present a badge that conveys the expected usage information in summary fashion. The badge corresponds to any kind of graphical object. For example, in the case of FIG. 11, the environment 100 presents a summary badge which indicates that the candidate application is rated "application light," meaning that, relatively speaking, the candidate application is not expected to consume a large quantity of data in use. The environment 100 can classify the candidate application in this manner by again taking into account the manner in which other users have interacted with the candidate application. For instance, the environment 100 can form an average value that represents the average consumption of the other users, and then determine what range this average value falls within; the environment 100 can then assign a summary badge corresponding to the identified range. The environment 100 can classify the candidate application in this manner with or without taking into consideration user profile data.

Alternatively, or in addition, the environment 100 can express how the candidate application compares with other applications that perform the same basic function as the candidate application. The environment 100 can compute this metric by generating usage information for the candidate application and then generating usage information for other related applications. (The usage information for other related applications can take into consideration the behavior of the particular target user and other users, or just the particular user, or just the other users.) The environment 100 can then present information which reflects the usage difference between the candidate application and its peer applications. For example, the environment 100 can express two numbers which reflect the usage of the candidate application and the usage of its peers, respectively. Alternatively, or in addition, the environment 100 can provide a summary badge which reflects the relative efficiency of the candidate application with respect to its related applications. For example, the environment 100 can rate the data usage of a video editing candidate application relative to the data usage of other video editing applications. A summary badge provides an indication of whether the candidate application is data-efficient within its class of related applications.

In scenario 1110, the environment 100 presents the expected usage information in the form of a distribution of data usage readings, instead of (or in addition to) an average value or the like (as in the case of scenario 1104). For example, the environment 100 can express the distribution as a histogram which identifies the range of behavior among users who have used the candidate application. Again, this distribution can be generated with or without taking into consideration user profile data.

In scenario 1112, the environment 100 presents expected usage information for a new or otherwise rarely-used candidate application. The environment 100 can formulate the expected usage information in this circumstance based on simulated usage data, or based on a combination of simulated usage data and actual usage data. The usage simulator 404 of FIG. 4 provides the simulated usage data. More specifically, in one case, the environment 100 can compute the expected usage information based on a weighted combination of the actual usage data and the simulated usage data. A weight applied to the simulated usage data decreases as additional actual usage data is obtained.

Advancing to FIG. 12, this figure shows a scenario in which the environment 100 presents data-related personal usage information in conjunction with energy-related personal usage information. The data-related personal usage information may not necessarily track the energy-related personal usage information because the energy-related personal usage information measures all of the energy consumed by the application, not just the energy consumed in performing data transfers. However, it is also possible to generate energy-related personal usage information which specifically targets application functions which perform data transfers. The information imparted by FIG. 12 allows a user to gain insight as to the financial cost of running the application, as well as the extent to which the application will drain the battery of the user device 102 when running. Although not shown, any type of expected usage information shown in FIG. 11 can be expressed in the context of energy usage, rather than (or in addition to) data usage.

FIG. 13 shows a scenario in which the environment 100 presents more detailed application-level usage personal information to a user (or other entity) compared to the previous examples. More specifically, the environment 100 can generate usage information which identifies the functions associated with each application and the amount of data that each function has consumed. A function consumes data when it sends or receives data via the wireless communication infrastructure 204. Some functions may correspond to foreground tasks while other processes may correspond to background tasks. A foreground task refers to a function that directly serves a main purpose of the application. A backend task refers to a function that performs a tangential function with respect to the overriding purpose of the application. For example, a user may interact with a social networking application to interact with his or her friends, e.g., by sharing messages and video items with the friends. This activity represents a foreground task because it carries out the user's principal purpose in interacting with the application. But that same application may also devote a certain amount of network activity to presenting ads to the user while the user uses the social networking functions. This activity represents a background task because it is not performed in direct response to the user's instruction, and may therefore occur without the user even interacting with the application.

A user can apply the insight provided by the per-function usage information shown in FIG. 13 in various ways. For example, a user may decide to terminate (or reduce the use of) an installed application that consumes a significant amount of data in performing background tasks or otherwise extraneous tasks. Or a user may decline to download a candidate application which exhibits high data usage for background tasks. The environment 100 can also provide per-function usage information expressed in terms of energy consumption.

The environment 100 can also optionally summarize the data efficiency of an application with a summary badge or some other graphical object or score. The data efficiency may express, among other considerations, the portion of data consumed in foreground tasks relative to the portion of data consumed in background tasks. In addition, or alternatively, the data efficiency may express the amount of background consumption of the particular application relative to the background consumption of related applications that perform the same basis task.

In FIG. 14, the environment 100 formulates personal usage information in terms of data type. That is, in this particular example, the environment 100 identifies different types of data, including text, image, audio streaming, video streaming, etc. The environment 100 then conveys how much of each type of data the user device 102 has consumed so far in a billing cycle. Although not shown, the environment 100 can also present this data on a per-application basis, or a per-application-class basis. In addition, the environment 100 can present comparison usage information which reflects the per-data-type data usage of a group of other users.

FIG. 15 shows a scenario in which the environment 100 may present per-function usage information that is even more detailed compared to the case of FIG. 13. For example, in the case of FIG. 15, the environment 100 can also identify the network entities associated with different transactions that consume data within an application. That information is referred to as entity identification information herein. In one case, the network entities may be identified by examining the destinations which receive data and/or sources which provide data; in another case, the network entities may be identified by examining the respective ports of the user device 102, and so on. In some cases, the entity identification information may reveal the agents in a network transaction that are financially benefiting from the transaction.

A developer or other entity may request the per-function usage information shown in FIG. 15 with the objective of modifying the manner in which a corresponding application consumes data. For example, a developer may find that a certain function of an application is consuming an excessive amount of data, e.g., because it involves redundant or otherwise inefficient network transactions or the like. The developer may therefore choose to redesign certain features of the application to make it more efficient. In general, the developer can modify the application in any manner, e.g., by changing the manner in which it performs data compression, the manner in which it performs data caching, and so on. Alternatively, or in addition, the developer may simply eliminate or reduce the use of certain functions.

Alternatively, or in addition, the developer can modify an application to change the network entities that are involved in certain data-consuming transactions. Such a change may not necessarily change the total amount of data that is being consumed; rather, in some cases, this type of change may be motivated by business considerations (e.g., financial considerations) that are relevant to a particular environment.

B. Illustrative Processes

FIGS. 16-19 show procedures that explain one manner of operation of the environment of FIG. 1. Since the principles underlying the operation of the environment 100 have already been described in Section A, certain operations will be addressed in summary fashion in this section.

Figure 16:
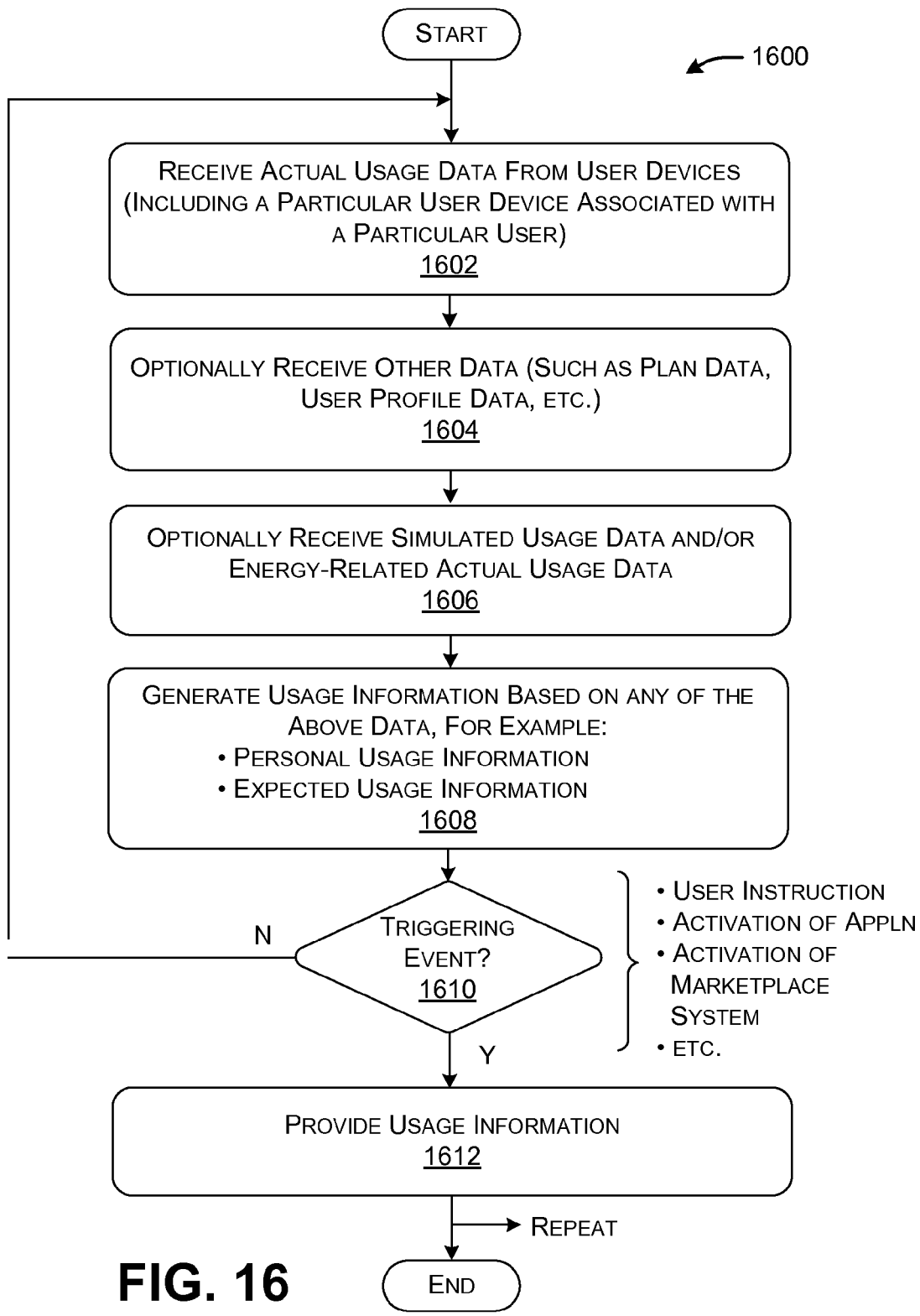
FIG. 16 is a flowchart that describes one illustrative manner of operation of the environment of FIG. 1.

Starting with FIG. 16, this figure shows a procedure 1600 that presents an overview of one illustrative manner of operation of the environment 100 of FIG. 1. In block 1602, the processing system 106 can receive actual usage data (i.e., data-related actual usage data) from user devices operated by respective users. One of the user devices is a particular user device operated by a particular user. In block 1604, the processing system 106 can optionally receive supplemental data which can be used in the computation of usage information, but does not itself express the consumption of data. For example, the supplemental data may include plan data, user profile data, etc. In block 1606, the processing system 106 can optionally receive simulated usage data which reflects the simulated usage of applications, and/or energy-related actual usage data. All of the above data generally constitutes usage data according to the terminology used herein.

In block 1608, the processing system 106 generates usage information based on any part(s) of the usage data collected in blocks 1602-1606. The usage information may constitute any of personal usage information, expected usage information, projected usage information, comparison usage information, per-process detailed usage information, etc., as described in Section A.

In block 1610, the environment 100 determines whether a triggering event has been received. Illustrative types of triggering events include an express request for personal usage information by the particular user, the activation of an application by the particular user, or the activation of the marketplace system 124 by the particular user. In block 1612, in response to the triggering event, the processing system 106 presents the appropriate usage information that has been generated in block 1608, e.g., by presenting personal usage information in some circumstances and expected usage information in other circumstances (depending on the nature of the triggering event that has been received). FIG. 16 indicates that the usage information is computed prior to the receipt of the triggering event, but the processing system 106 can also generate the usage information following the receipt of the triggering event.

Figure 17:
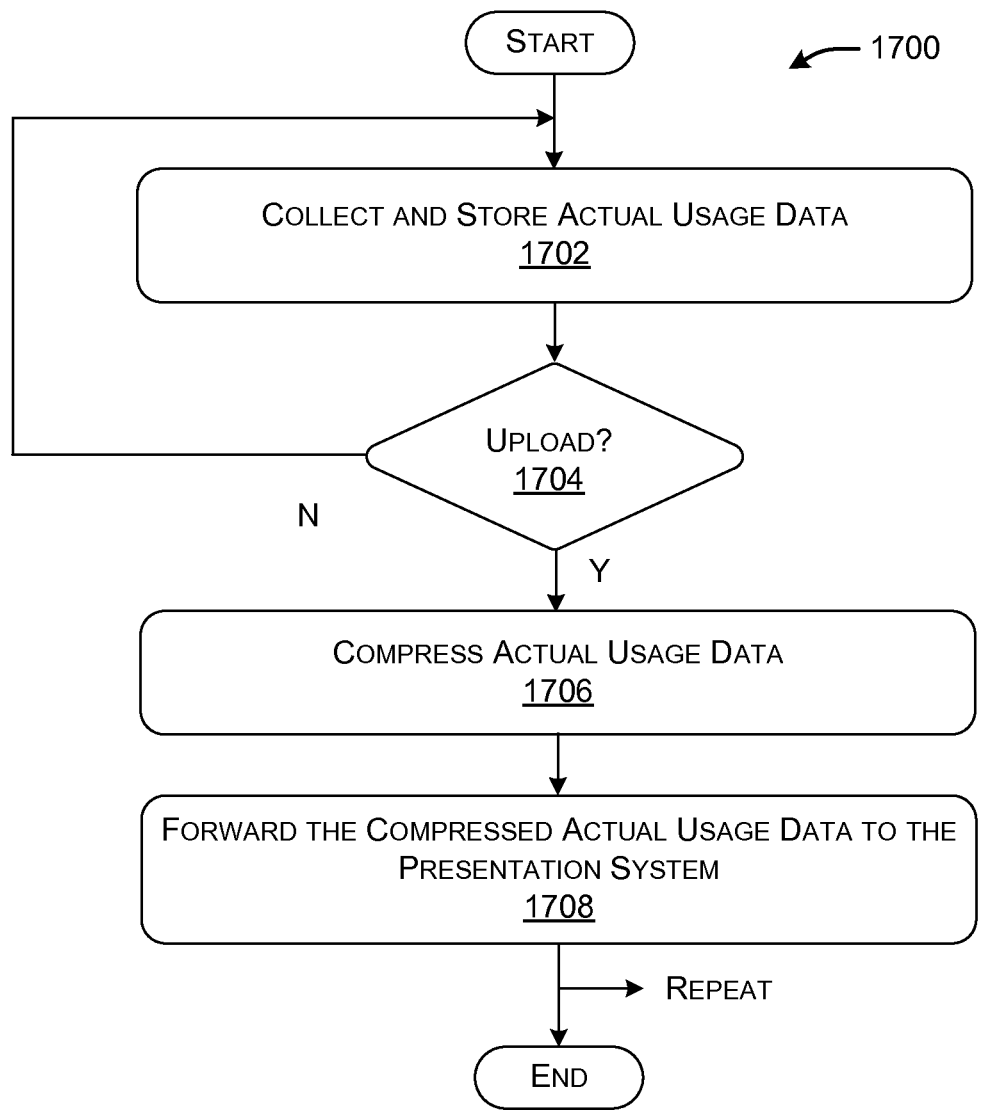
FIG. 17 is a flowchart that describes one illustrative manner of operation of the reporting module of FIG. 3.

FIG. 17 shows a procedure 1700 for forwarding data-related actual usage data from the user device 102 to the processing system 106. In block 1702, the user device 102 collects the actual usage data from one or more event sources 304 and stores that data in the temporary store 114. In block 1704, the user device 102 determine whether it is time to upload the actual usage data provided in the temporary store 114. If block 1704 is answered in the affirmative, in block 1706, the user device 102 compresses the actual usage data. In block 1708, the user device 102 forwards the compressed actual usage data to the processing system 106.

Figure 18:
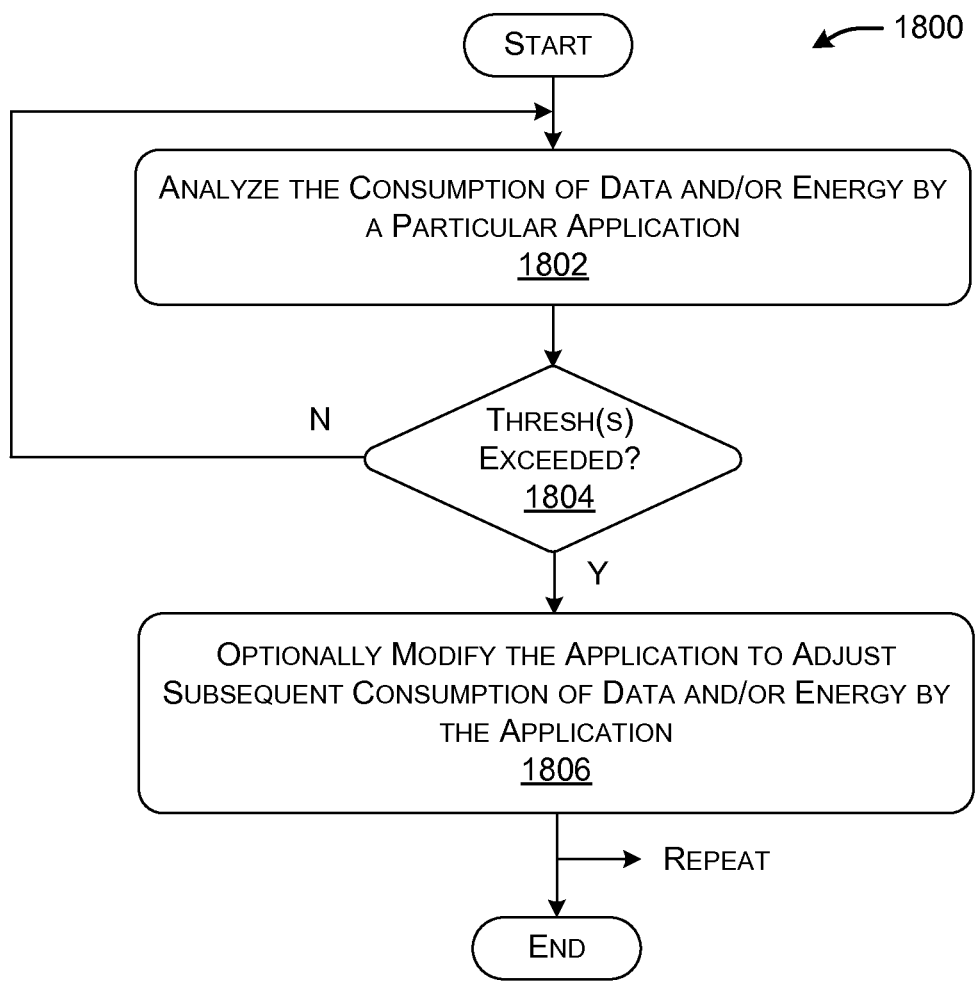
FIG. 18 is a flowchart that describes one illustrative manner of operation of a device modification module shown in FIG. 6; the device modification module operates by modifying an application installed on a user device (or otherwise accessible to the user device) based on an amount of data (or other resource(s)) consumed by the application.

FIG. 18 shows a procedure 1800 whereby the device modification module 612 (of FIG. 6) can modify the behavior of the user device 102 based on usage information and/or raw usage data (data-related and/or energy-related). In block 1802, the device modification module 612 monitors usage information (or usage data) with respect to a particular application. In block 1804, the device modification module 612 determines whether the usage exceeds a prescribed threshold or otherwise constitutes a triggering event. In block 1806, if block 1604 is answered in the affirmative, the device modification module 612 modifies the behavior of the application in any of the ways described in Section A.

Figure 19:
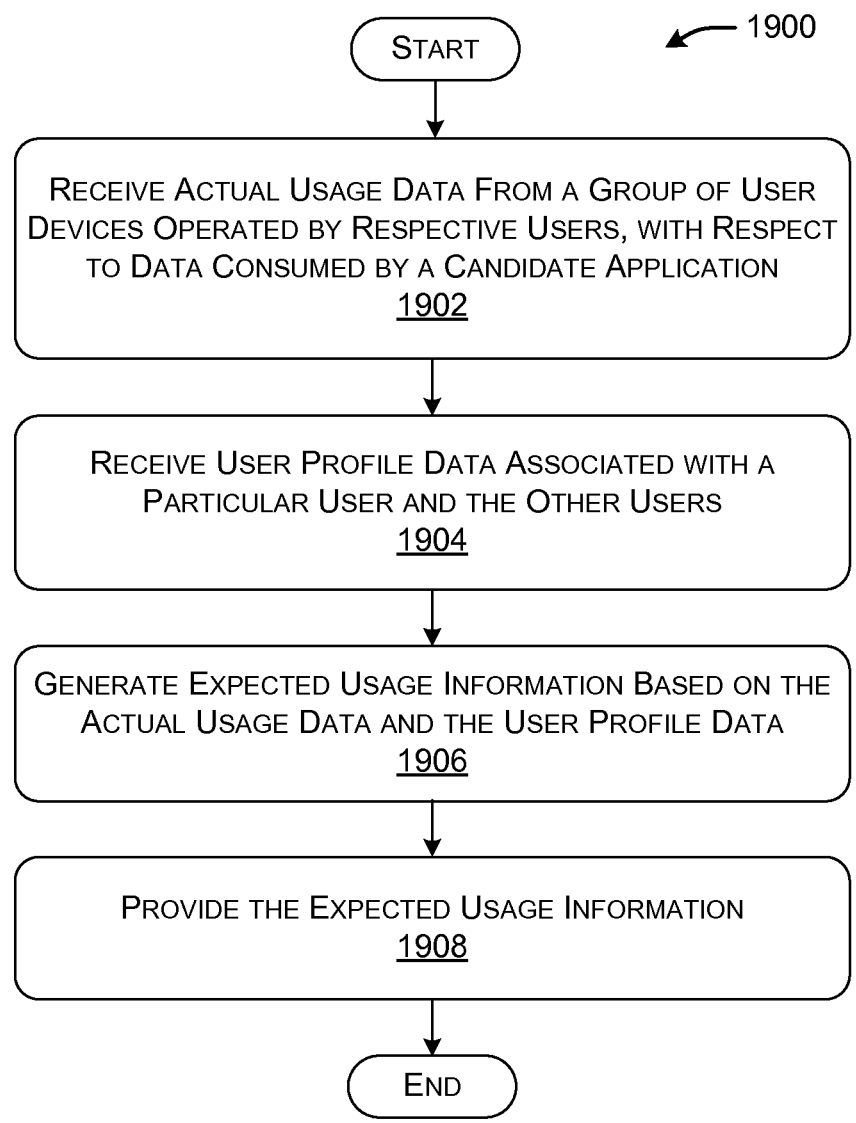
FIG. 19 is a flowchart that describes one illustrative manner of providing expected usage information based, in part, on user profile data.

Finally, FIG. 19 shows a procedure 1900 by which the processing system 106 can generate expected usage information (data-related and/or energy-related), e.g., when the user visits the marketplace system 124. The processing system 106 performs this task by taking into consideration at least one usage-related characteristic of a user.

In block 1902, the processing system 106 receives actual usage data from a group of user devices operated by respective users. The actual usage data describes actual consumption of data (or other resources) by a candidate application that is run by the user devices. In block 1904, the processing system 106 receives particular user profile data associated with the particular user to whom the expected usage information is to be presented, together with other user profile data associated with the other users (who operate the group of user devices). In block 1906, the processing system 106 computes the expected usage information based on the actual usage data, the particular user profile data, and the other user profile data. For example, assume that the user profile data reveals that the particular user is a high-consumption data user. The processing system 106 can form this conclusion by examining the manner in which the user interacts with all applications, or just those applications which are similar to the candidate application in question. In one case, the processing system 106 can then form expected usage information by processing actual usage data obtained from other high-consumption users (within the group of users who have actually used the candidate application). More generally, the processing system 106 generates the expected usage information for the particular user by applying the actual usage data from a subset of other users who share at least one usage-related characteristic in common with the particular user. For example, two users may be comparable because they both are categorized as high-consumption data users (in general, or with respect to a certain class of applications). In addition, these two users may share the same data plan. In block 1908, the processing system 106 can provide the expected usage information to the particular user.

C. Representative Computing Functionality

FIG. 20 sets forth illustrative computing functionality 2000 that can be used to implement any aspect of the functions described above. For example, the computing functionality 2000 can be used to implement any aspect of the environment 100 of FIG. 1, e.g., including any user device and any aspect of the processing system 106. In one case, the computing functionality 2000 may correspond to any type of computing device that includes one or more processing devices. In all cases, the electrical data computing functionality 2000 represents one or more physical and tangible processing mechanisms.

The computing functionality 2000 can include volatile and non-volatile memory, such as RAM 2002 and ROM 2004, as well as one or more processing devices 2006 (e.g., one or more CPUs, and/or one or more GPUs, etc.). The computing functionality 2000 also optionally includes various media devices 2008, such as a hard disk module, an optical disk module, and so forth. The computing functionality 2000 can perform various operations identified above when the processing device(s) 2006 executes instructions that are maintained by memory (e.g., RAM 2002, ROM 2004, or elsewhere).

More generally, instructions and other information can be stored on any computer readable medium 2010, including, but not limited to, static memory storage devices, magnetic storage devices, optical storage devices, and so on. The term computer readable medium also encompasses plural storage devices. In all cases, the computer readable medium 2010 represents some form of physical and tangible entity.

The computing functionality 2000 also includes an input/output module 2012 for receiving various inputs (via input modules 2014), and for providing various outputs (via output modules). One particular output mechanism may include a presentation module 2016 and an associated graphical user interface (GUI) 2018. The computing functionality 2000 can also include one or more network interfaces 2020 for exchanging data with other devices via one or more communication conduits 2022. One or more communication buses 2024 communicatively couple the above-described components together.

The communication conduit(s) 2022 can be implemented in any manner, e.g., by a local area network, a wide area network (e.g., the Internet), etc., or any combination thereof. The communication conduit(s) 2022 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by computing functionality, for providing usage information, comprising:
  receiving actual usage data from user devices operated by respective users, the user devices including a particular user device operated by a particular user,
  the actual usage data describing actual consumption of data by a set of applications that are run by the user devices, an application consuming data when it causes the data to be communicated via wireless communication infrastructure;
  generating application-level usage information based on the actual usage data, said generating comprising at least:
    generating personal usage information which describes actual consumption of data by a particular application run by the particular user device; and generating expected usage information associated with a candidate application provided by a marketplace system, the expected usage information describing an expected consumption of data by the candidate application upon running of the candidate application by the particular user device;

receiving a triggering event from the particular user device operated by the particular user; and in response to the triggering event, providing either the personal usage information or the expected usage information to the particular user, depending on a type of the triggering event that has been received.

2. The method of claim 1, further comprising receiving plan data which describes a data plan which governs consumption of data by the particular user, said generating further comprising generating the personal usage information with reference to the plan data.

3. The method of claim 1, further comprising receiving application-specific quotas, specified by the particular user, each application-specific quota describing an amount of data allocated to a corresponding application, said generating further comprising generating the personal usage information with reference to the application-specific quotas.

4. The method of claim 1, wherein said generating further comprises generating the personal usage information with respect to at least two network interface modes, said generating further comprising identifying at least one network entity associated with at least one of the network interface modes.

5. The method of claim 1, wherein said generating further comprises extending the personal usage information to generate projected usage information, the projected usage information estimating future consumption of data by the particular application, further comprising providing the projected usage information to the particular user in conjunction with the personal usage information.

6. The method of claim 1, wherein said generating further comprises generating comparison usage information by processing actual usage data received from a group of user devices, besides the particular user device, which have run the particular application, and further comprising providing the comparison usage information to the particular user in conjunction with the personal usage information.

7. The method of claim 1, further comprising providing data type usage information to the particular user which distinguishes respective amounts of different types of data that the particular user device has consumed.

8. The method of claim 1, wherein said generating further comprises generating the expected usage information by processing actual usage data received from a group of user devices which have run the candidate application.

9. The method of claim 8, wherein the expected usage information comprises at least one of:

an average value which describes average actual data usage of the candidate application by the group of user devices;

a standard deviation value which describes a standard deviation associated with the average usage value;

a median value which describes a median actual data usage of the candidate application by the group of user devices; and distribution information which describes a distribution of actual data usage of the candidate application by the group of users devices.

10. The method of claim 1, further comprising receiving:

particular user profile data which describes a manner in which the particular user operates the applications, and other user profile data which describes a manner in which each user in a group of other users operates the applications, said generating further comprising providing the expected usage information based on actual usage data provided by a subset of the group of other users who share at least one characteristic in common with the particular user, as assessed based on the particular user profile data and the other user profile data.

11. The method of claim 1, wherein said generating comprises expressing the expected usage information as a summary badge, the summary badge reflecting a relative data efficiency of the candidate application.

12. The method of claim 1, further comprising receiving simulated usage data based on a simulated consumption of data by the candidate application, said generating comprising generating the expected usage information based, at least in part, on the simulated usage data.

13. The method of claim 12, wherein said generating comprises generating the expected usage information based on a weighted combination of the actual usage data and the simulated usage data, a weight applied to the simulated usage data decreasing with increasing actual use of the candidate application by other users.

14. The method of claim 1, wherein the personal usage information also provides energy-related personal usage information which describes an actual consumption of energy by the particular application, and wherein the expected usage information also provides energy-related expected usage information which describes an amount of energy that the candidate application is expected to consume, wherein the energy-related personal usage information and the energy-related expected usage information are based on collected energy-related actual usage data.

15. The method of claim 1, wherein said generating further comprises generating per-function usage information that indicates amounts of data consumed by respective functions of the particular application.

16. The method of claim 15, wherein the per-function usage information indicates an amount of data consumed by the particular application that is attributable to at least one backend process associated with the particular application.

17. The method of claim 1, wherein said generating further comprises providing entity identification information which identifies at least one network entity associated with a network transaction performed by the particular application.

18. The method of claim 1, further comprising modifying the particular application in response to the personal usage information, to adjust a subsequent amount of data consumed by the particular application.

19. A computer readable storage device for storing computer readable instructions, the computer readable instructions providing a usage analysis module when executed by one or more processing devices, the computer readable instructions comprising:

logic configured to receive actual usage data from a group of user devices operated by respective users, the actual usage data describing actual consumption of resources by a candidate application that is run by the user devices;

logic configured to receive:

particular user profile data associated with a particular user, the particular user profile data describing a manner in which the particular user interacts with applications; and other user profile data associated with the users, the other user profile data describing a manner in which each of the users interacts with the applications; and logic configured to generate expected usage information based on the actual usage data, the particular user profile data, and the other user profile data, the expected usage information describing an amount of resources that the candidate application is expected to consume when used by the particular user.

20. A usage analysis module, implemented by computing functionality, for providing usage information, comprising:

logic configured to receive actual usage data from user devices operated by respective users, the user devices including a particular user device operated by a particular user, the actual usage data describing actual consumption of resources by a set of applications that are run by the user devices;

logic configured to generate application-level usage information based on the actual usage data, said generating comprising at least:

generating personal usage information which describes actual consumption of resources by a particular application that is run by the particular user device; and generating expected usage information associated with a candidate application provided by a marketplace system, the expected usage information describing an expected consumption of resources by the candidate application upon running the candidate application by the particular user device.

* * * * *